United States Patent [19]
Javidi

[11] Patent Number: 5,699,449
[45] Date of Patent: Dec. 16, 1997

[54] METHOD AND APPARATUS FOR IMPLEMENTATION OF NEURAL NETWORKS FOR FACE RECOGNITION

[75] Inventor: Bahram Javidi, Storrs, Conn.

[73] Assignee: The University of Connecticut, Storrs, Conn.

[21] Appl. No.: 339,118

[22] Filed: Nov. 14, 1994

[51] Int. Cl.$^6$ .............................. G06K 9/62; G06K 9/36; G02B 27/46; G06E 3/00
[52] U.S. Cl. ........................ 382/156; 382/118; 382/280; 359/561; 359/559; 364/822
[58] Field of Search ........................ 382/118, 156, 382/278, 280; 359/561, 559; 395/25; 364/822

[56] References Cited

U.S. PATENT DOCUMENTS

| | | | |
|---|---|---|---|
| 4,832,447 | 5/1989 | Javidi | 364/822 |
| 4,959,532 | 9/1990 | Owechko | 395/25 |
| 5,040,140 | 8/1991 | Horner | 382/42 |
| 5,111,515 | 5/1992 | Javidi | 382/280 |
| 5,119,443 | 6/1992 | Javidi et al. | 382/278 |
| 5,367,579 | 11/1994 | Javidi et al. | 382/278 |
| 5,485,312 | 1/1996 | Horner et al. | 382/280 |

OTHER PUBLICATIONS

"A Technique for optically convolving two functions", by C.S. Weaver and J.W. Goodman, Appl. Opt. vol. 5, pp. 1248–1249, 1966.

"Nonlinear Joint Transform Correlation: An Optimal Solution For Adaptive Image Discrimination and Input Noise Robustness", by P. Refregier, V. Laude and B. Javidi, Opt. Lett. vol. 19, No. 6, pp. 405–407, 1994.

"Experiments on nonlinear joint transform correlator using an optically addresses spatial light modulator in the Fourier plane", by B. Javidi, Q. Tang, D.A. Gregory and T.D. Hudson, Appl. Opt., vol. 30, No. 14, pp. 1772–1776, 1991.

"1-f Binary Joint Correlator", by K.H. Fielding and J.L. Horner, Opt. Eng. vol. 29, pp. 1081 1087, 1990.

"Sensitivity of the nonlinear joint transform correlator: experimental investigations", by Q. Tang and B. Javidi, Appl. Opt. vol. 31, No. 20, pp. 4016–4024, Jul. 1992.

"Design elements of binary joint transform correlation and selected optimization techniques", by W.B. Hahn and D.L. Flannery, Opt. Eng. vol. 31, pp. 896–905, 1992.

"Single spatial light modulator joint transform correlator", by Bahram Javidi and Joseph L. Horner, Appl. Opt. vol. 28, No. 5, pp. 1027–1029, Mar. 1989.

"Nonlinear joint power spectrum based optical correlation", by Bahram Javidi, Appl. Opt., vol. 28, No. 12, pp. 2358–2367, Jun. 1989.

"Optical fingerprint identification by binary joint transform correlation", by Kenneth H. Fielding, Joseph L. Horner and Charles Makekau, Optical Eng., Dec. 1991, vol. 30, No. 12.

*Primary Examiner*—Leo Boudreau
*Assistant Examiner*—Monica S. Davis
*Attorney, Agent, or Firm*—Fishman, Dionne, Cantor & Colburn

[57] ABSTRACT

A method and apparatus for implementation of neural networks for face recognition is presented. A nonlinear filter or a nonlinear joint transform correlator (JTC) employs a supervised perceptron learning algorithm in a two-layer neural network for real-time face recognition. The nonlinear filter is generally implemented electronically, while the nonlinear joint transform correlator is generally implemented optically. The system implements perception learning to train with a sequence of facial images and then classifies a distorted input image in real-time. Computer simulations and optical experimental results show that the system can identify the input with the probability of error less than 3%. By using time multiplexing of the input image under investigation, that is, using more than one input image, the probability of error for classification can be reduced to zero.

62 Claims, 33 Drawing Sheets

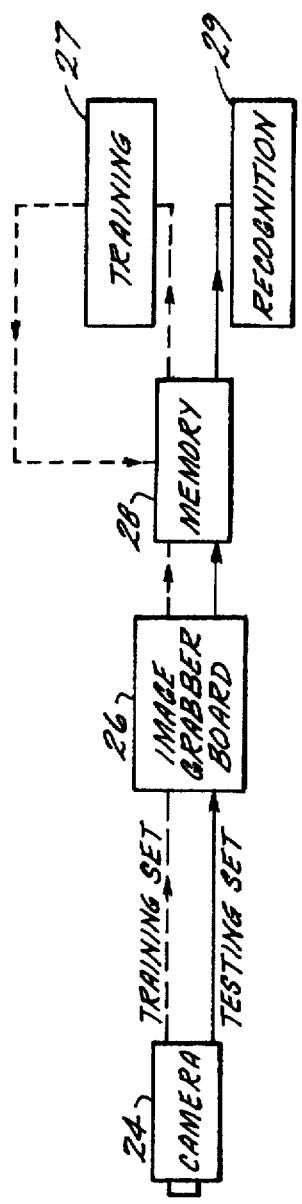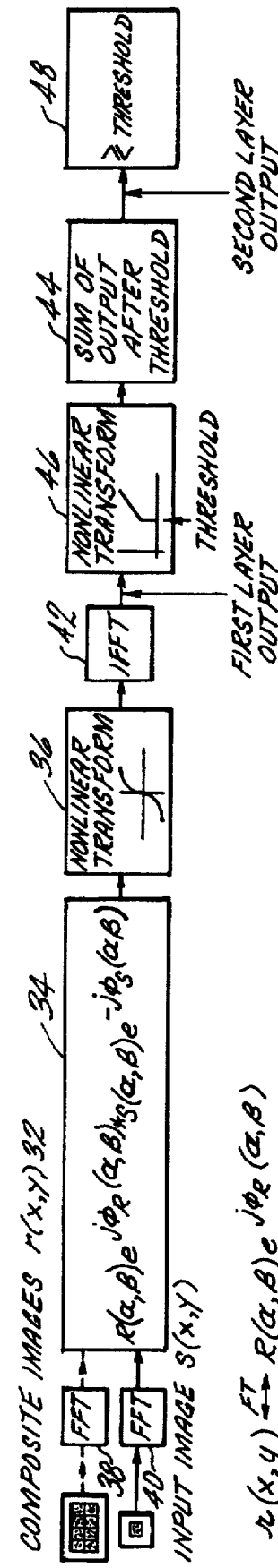

WEIGHTS OR CLUSTER (LEFT)   INPUT IMAGE (RIGHT)

WEIGHTS OR CLUSTER (LEFT)   INPUT IMAGE (RIGHT)

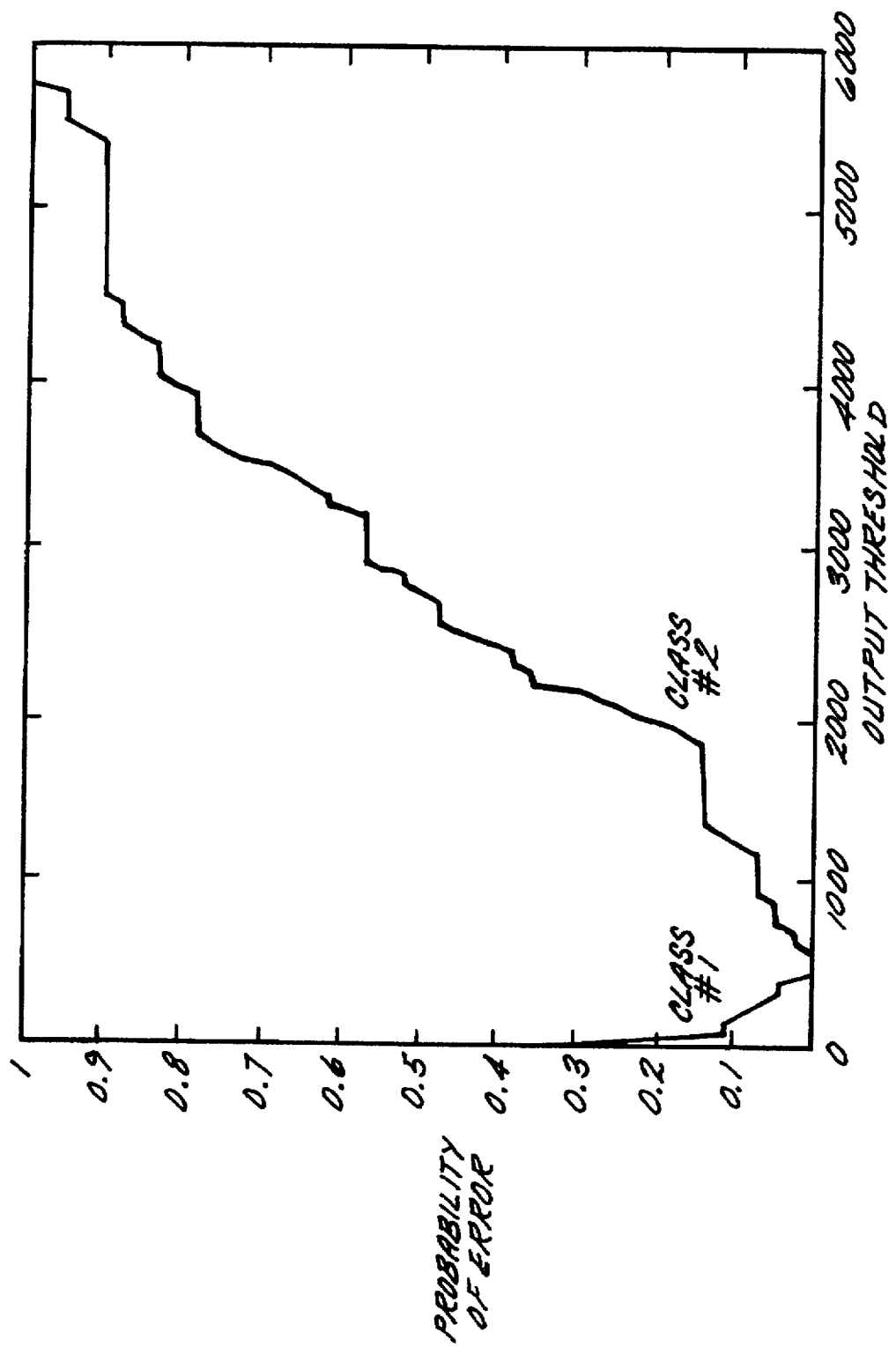

METHOD AND APPARATUS FOR IMPLEMENTATION OF NEURAL NETWORKS FOR FACE RECOGNITION

BACKGROUND OF THE INVENTION

Face recognition is an important application of pattern recognition and neural networks. It is, however, a difficult task since the facial appearance is constantly changing due to different head perspectives, different illuminations and hair styles. A photorefractive hologram based network for real-time face recognition has been proposed and experimentally demonstrated. The photorefractive hologram based system is trained by gradually adapting photorefractive holograms, and can recognize at standard video rates the images of faces for which it has been trained. Perceptron neural networks have been implemented by using a volume hologram in which weights were stored holographically. A perceptron algorithm has also been implemented using photorefractive crystals for adaptable interconnections but using incoherent erasure to achieve subtractive weight changes. Further, optical demonstrations of perceptron learning using a spatial light rebroadcaster have been reported. Joint transform correlators are known, by way of example such are described in U.S. Pat. No. 4,832,447 to Javidi; U.S. Pat. No. 5,040,140 to Homer and U.S. Pat. No. 5,119,443 to Javidi et al.

SUMMARY OF THE INVENTION

In accordance with the present invention, a method and apparatus for implementation of neural networks for face recognition is presented. A first layer of the two-layer neural network is implemented using either a nonlinear filter or a nonlinear joint transform correlator (JTC), in association with a supervised perceptron learning algorithm. A second layer of the two-layer neural network is implemented electronically due to the small number of hidden layer neurons. The nonlinear filter is generally implemented electronically, while the nonlinear joint transform correlator is generally implemented optically. The use of the nonlinear JTC in the present system provides for ease in implementation optically, is robust in terms of system alignment and is relatively inexpensive. The system is trained with a sequence of input facial images and is able to classify an input face in real-time. In general, the system is trained by updating reference images (i.e., weights) in the input which can be stored in electronic or optical memories, without the need of filters or holograms.

The nonlinear JTC uses nonlinear transformation in the Fourier plane to provide improved discrimination and reduced sensitivity to distortion. Accordingly, the system is robust to illumination variations of the input image, has a good discrimination sensitivity; and is shift invariant.

In the JTC an input pattern x and a reference pattern w are displayed side by side on a spatial light modulator (e.g., a liquid crystal television) at the input plane. Patterns x and w are jointly Fourier transformed by a first Fourier transform lens. The interference intensity or joint power spectrum is recorded by a spatial light modulator (e.g., a liquid crystal light valve or a CCD array) located at the back focal plane of the first lens. The joint power spectrum is Fourier transformed by a second Fourier transform lens to obtain the correlation between the input pattern x and the reference pattern w.

Input pattern x consists of a number of neurons displayed in the input plane of the system that are connected to the neurons in the output plane via interconnection weights. Interconnection weights are the neurons which form the reference pattern w. The correlation peak at the output plane of the JTC is the inner-product <x,w> of the weights stored as the reference pattern w and the input pattern x. The correlation signal is detected by a charge coupled device (CCD) detector interfaced with a computer. The nonlinear thresholding is performed electronically to obtain the output neuron. Updating the weights is carried out electronically and the results are displayed on the input device (i.e.,liquid crystal television).

In order to implement nonlinear filtering to improve the correlation performance, the nonlinear JTC uses nonlinear techniques in the Fourier plane to nonlinearily transform the joint power spectrum. Varying the severity of the nonlinearity will produce correlation signals with different characteristics. For highly nonlinear transformations, the high spatial frequencies are emphasized and the correlator becomes more sensitive in terms of discrimination. The Fourier plane nonlinearity can be adjusted to optimize the nonlinear JTC performance in terms of input image noise robustness and discrimination. The joint power spectrum may be nonlinearly transformed using an optically addressed spatial light modulator operating in a nonlinear mode. Alternatively, the joint power spectrum is generated using a CCD array and is nonlinearly transformed electronically. It is well known that a nonlinear JTC out performs a conventional JTC in terms of optical efficiency, output peak to scene noise ratio, and output peak to sidelobe ratio.

In a training procedure of the first layer of the neural network, the input image is compared with stored reference images (i.e., weights) displayed at the nonlinear JTC input by means of cross-correlation. If the degree of similarity is below a threshold, the input is added into the weights to create a new reference image. Updated weights will be used to test a new input and the process is repeated. The input is compared with reference images either sequentially or in parallel. Parallel implementation reduces the training time. However, the parallel implementation is limited by the available dynamic range and space-bandwidth product of the input spatial light modulator.

For parallel implementation, weight images are grouped into clusters of M images each. The image in one cluster form a composite image. An advantage of using clusters is that the input is not compared with individual weight images but it is compared in parallel with the composite image in the cluster. When a new input is to be added to or subtracted from the weights, only the corresponding composite image needs to be retrained. The composite images in each cluster can be simultaneously displayed at the input plane by spatially separating them. The number of images that can be spatially separated at the input is determined by the available input space bandwidth product of the display device and the size of the images.

The weights of the second layer of the neural network can be determined according to the a-priori probabilities of the input images. It is assumed that the probability of the input images belonging to each cluster is the same. In other words, the various distorted input images are equally likely. Thus, the weights of the second layer are equal. Thus, the outputs of the first layer are nonlinearly transformed and are summed to produce the second layer output. If the input distortions, used to train the clusters, are not equally likely, the weights of the second layer can be adjusted according to the a-priori probabilities of the clusters.

In the electronic implementation of the first layer of the two-layer neural network, the system consists of a video camera and a personal computer interfaced with a frame grabber board as is known. The facial images are captured by the video camera and stored in the video tape or in the computer. These images are used as the inputs of the neural networks. The input images are compared with the composite image stored in the database. The comparison is conducted by running a computer program designed to simulate a nonlinear JTC, i.e., a nonlinear filter. Each element of the hidden layer is the response of the neural networks to the input image when only one cluster is used. The output is the response of the system when all the clusters are used. More specifically, the output is the sum of the responses of individual clusters passed through a binary nonlinearity.

In the training procedure, a total of, for example, one hundred twenty eight facial images including different head perspectives and different facial motions are captured. These training samples or images are grouped into clusters. Each cluster includes a corresponding composite image, to be used as weights, constructed by selected reference images.

When the training for a person's images is completed, the system can recognize distortions of the input facial image. The same procedure is used to train the system for other facial images. For classification, the input is compared with the clusters corresponding to various persons. The output response of the neural networks is produced at the second layer by summing the output peak intensities (i.e., outputs of the first layer) resulting from the clusters of a specific person to an input image. The response of the neural networks that exceeds the threshold determines whether the person belongs to the class represented by the clusters.

The performance of the system can be improved by using the time multiplexing of the input images of the same person. The output response of the system is determined by examining more than one input image to classify that image. Using time multiplexing of the input image, the output response of the system is the average of the system's response to a plurality (e.g., four) distorted input images of the same person. With an appropriate output threshold level, the overall probability of error of the system using time multiplexing can be reduced to zero.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 2B is a schematic diagram of an electronic implementation of the present invention;

FIG. 2C is a schematic diagram of the recognition mode of operation of the system of FIG. 2B;

FIG. 15E are plots of probability of error versus the output threshold level when time multiplexing of the input images is used;

DESCRIPTION OF THE PREFERRED EMBODIMENT

Figure 1:
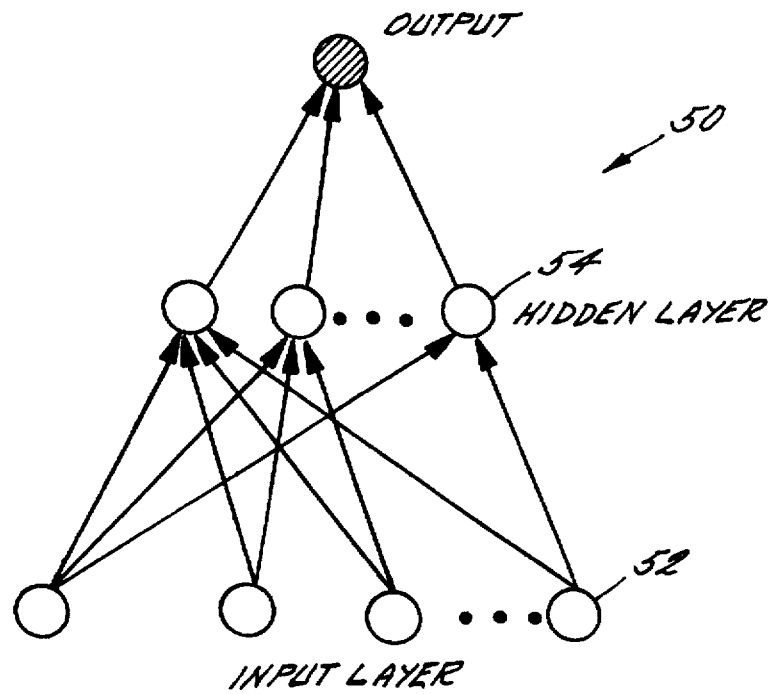
FIG. 1 is a diagrammatic view of a two layer neural networks used in face recognition in accordance with the present invention.

Referring to FIG. 1, a two-layer neural network for real-time face recognition in accordance with the present invention is shown generally at 50. As will be described in more detail hereinafter, the present invention employs either a nonlinear filter or a nonlinear joint transform correlator (JTC), in association with a supervised perceptron learning algorithm for a first layer 52 of the neural network. A second layer 54 is implemented electronically due to the small number of hidden layer neurons. The nonlinear filter is generally implemented electronically, while the nonlinear joint transform correlator is generally implemented optically. The use of the nonlinear JTC in the present system provides for ease in implementation optically, is robust in terms of system alignment and is relatively inexpensive. The system is trained with a sequence of input facial images and is able to classify an input face in real-time. In general, the system is trained by updating reference images (i.e., weights) in the input which can be stored in electronic or optical memories, without the need of filters or holograms.

The nonlinear JTC uses nonlinear transformation in the Fourier plane to provide improved discrimination and reduced sensitivity to distortion. Accordingly, the system is robust to illumination variations of the input image, has a good discrimination sensitivity; and is shift invariant.

In a single layer neural network with N input neuron elements and one output neuron element y, the output is expressed by:

$$y = f\left(\sum_{i}^{N} w_i x_i - \theta\right) \tag{1}$$

where;

$x_i$ is the ith neuron of the input pattern, $w_i$ is the weight of the interconnection between the ith neuron of input pattern and the output neuron, f is the neuron nonlinear function, and $\theta$ is the output neuron threshold value which is predetermined during training.

A single output neuron can dichotomize or separate the input patterns into two prescribed classes depending on the value of the output neuron. For purpose of illustration, it is assumed that classification is based on the following criterion:

$$\begin{cases} \text{if } y \geq 0 \text{ then } x \in C_1 \\ \text{if } y < 0 \text{ then } x \in C_2 \end{cases} \tag{2}$$

where;

$x = (x_1, x_2 \ldots , x_N)^T$ denotes the input pattern consisting of N neurons, and C1 and C2 indicate class 1 and class 2, respectively.

In a perceptron learning algorithm, interconnection weights are updated by using an iterative equation as follows:

$$w(t+1) = w(t) + \mu(t)x(t), \tag{3}$$

where;

$w = (w_1, w_2 \ldots , w_N)^T$ is a weight vector at time t, x(t) is an input pattern at time t, and $\mu(t)$ is a multiplier that is given by:

$$\mu(t) = \begin{cases} 0 & \text{if } y(t) \geq 0 \text{ and } x(t) \in C_1 \\ & \text{or } y(t) < 0 \text{ and } x(t) \in C_2 \\ -1 & \text{if } y(t) \geq 0 \text{ and } x(t) \in C_2 \\ 1 & \text{if } y(t) < 0 \text{ and } x(t) \in C_1 \end{cases} \tag{4}$$

The above equation (i.e., EQUATION 4) teaches that if a new input pattern is correctly classified during training, no changes are made for the weights. If the input pattern is incorrectly classified, the weights have to be updated. If $y(t) \geq 0$, according to EQUATION 2 the input pattern x is classified to be in class 1. But if the input was in class 2, the updated weights are obtained by subtracting the input patten from the current weights. If y(t)<0, according to EQUATION 2 the input pattern x is classified to be in class 2. But if the input was in class 1, the updated weights are obtained by adding the input pattern to the current weights.

Figure 2:
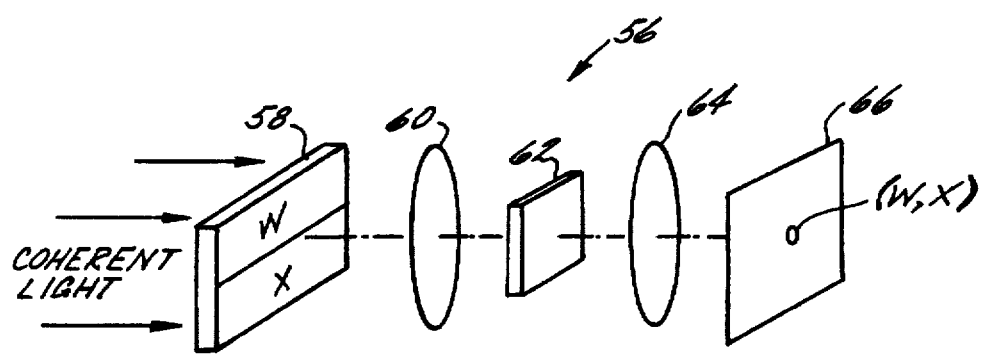
FIG. 2 is a schematic diagram of an implementation of an inner-product using a joint transform correlator in accordance with the present invention.

From EQUATION 1, it can be seen that the output of a perceptron is the inner product between the input pattern and the weights followed by a thresholding. Thus, the first layer 52 in FIG. 1 can be implemented by using a JTC. Referring to FIG. 2, a JTC is shown generally at 56, e.g., such as described in an article entitled "Technique for optically convolving two functions", by C. S. Weaver and J. W. Goodman, Appl. Opt. vol. 5, pp. 1248–1249, 1966, which is incorporated herein by reference. In JTC 56 the input pattern x and the reference pattern w are displayed side by side on a spatial light modulator 58 (e.g., a liquid crystal television) at the input plane. Patterns x and w are jointly Fourier transformed by a first Fourier transform lens 60. The interference intensity or joint power spectrum is recorded by a spatial light modulator 62 (e.g., a liquid crystal light valve or a CCD array) located at the back focal plane of lens 60. The joint power spectrum is Fourier transformed by a second Fourier transform lens 64 to obtain the correlation between the input pattern x and the reference pattern w.

Input pattern x consists of a number of neurons displayed in the input plane of the system that are connected to the neurons in the output plane via interconnection weights. Interconnection weights are the neurons which form the reference pattern w. The correlation peak at the output plane of the JTC 56 is the inner-product <x,w> of the weights stored as the reference pattern w and the input pattern x. The correlation signal is detected by a charge coupled device (CCD) detector 66 interfaced with a computer (not shown). The nonlinear thresholding is performed electronically to obtain the output neuron. Updating the weights is carded out electronically and the results are displayed on the input device (i.e.,liquid crystal television 58).

In order to implement nonlinear filtering to improve the correlation performance, nonlinear JTC 56 uses nonlinear techniques in the Fourier plane to nonlinearly transform the joint power spectrum. The expression for the nonlinearly transformed joint power spectrum is:

$$g(E) = \sum_{v=0}^{\infty} H_v[S(\alpha,\beta)R(\alpha,\beta)]\cos[2v x_0 \alpha + v\Phi_s(\alpha,\beta) - v\Phi_R(\alpha,\beta)] \quad (5)$$

where;

$$H_v[S(\alpha,\beta)R(\alpha,\beta)] = \quad (6)$$

$$\frac{\epsilon_v}{2\pi} \int G(\omega)\exp\{j\omega[S^2(\alpha,\beta) + R^2(\alpha,\beta)]\}J^v[2\omega R(\alpha,\beta)S(\alpha,\beta)]d\omega$$

where;

α and β are the spatial frequency coordinates,

R(α,β)exp{jΦ$_R$(α,β] is the Fourier transform of the reference image r(x,y),

S(α,β)exp[jΦ$_s$(α,β)] is the Fourier transform of the input image s(x,y), and

G(ω) is the Fourier transform of the nonlinearity.

It can be seen that for v=1 the nonlinear system has preserved the phase of the cross-correlation term [Φ$_s$(α,β) −Φ$_R$(α,β)] and only the amplitude is affected. This results in good correlation properties for the first-order correlation signal at the output plane. Varying the severity of the nonlinearity will produce correlation signals with different characteristics. For highly nonlinear transformations, the high spatial frequencies are emphasized and the correlator becomes more sensitive in terms of discrimination. The Fourier plane nonlinearity can be adjusted to optimize the nonlinear JTC performance in terms of input image noise robustness and discrimination, such as described in an article entitled "Nonlinear Joint Transform Correlation: An Optimal Solution For Adaptive Image Discrimination And Input Noise Robustness", by P. Refregier, V. Laude and B. Javidi, Opt. Lett. vol. 19, pp. 405–407, 1994, which is incorporated herein by reference. The joint power spectrum may be nonlinearly transformed using an optically addressed spatial light modulator operating in a nonlinear mode. Alternatively, the joint power spectrum is generated using a CCD array and is nonlinearly transformed electronically. It is well known that a nonlinear JTC out performs a conventional JTC in terms of optical efficiency, output peak to scene noise ratio, and output peak to sidelobe ratio. See generally: "Nonlinear joint power spectrum based optical correlations", by B. Javidi, Appl. Opt. vol. 28, pp. 2258–2367, 1989; "Experiments on nonlinear joint transform correlator using an optically addresses spatial light modulator in the Fourier plane", by B. Javidi, Q. Tang, D. A. Gregory and T. D. Hudson, Appl. Opt. vol. 30, pp. 1772–1776, 1991; "1-f binary joint correlator", by K. H. Fielding and J. L. Homer, Opt. Eng. vol 29, pp. 1081–1087, 1990; "Sensitivity of the nonlinear joint transform correlator: experimental investigations", by Q. Tang and B. Javidi, Appl. Opt. vol. 31, pp. 4016–4024, 1992; "Single SLM joint transform correlator", by B. Javidi and J. L. Homer, Appl. Opt. vol. 28, pp.1027–1032, 1989; "Design elements of binary joint transform correlation and selected optimization techniques", by W. B. Hahn and D. L. Flannery, Opt. Eng. vol. 31, pp. 896–905, 1992; and "Nonlinear Joint Transform Correlation: An Optimal Solution For Adaptive Image Discrimination And Input Noise Robustness", by P. Refregier, V. Laude and B. Javidi, Opt. Lett. vol. 19, pp. 405–407, 1994, all of which are incorporated herein by reference.

Figure 2A:
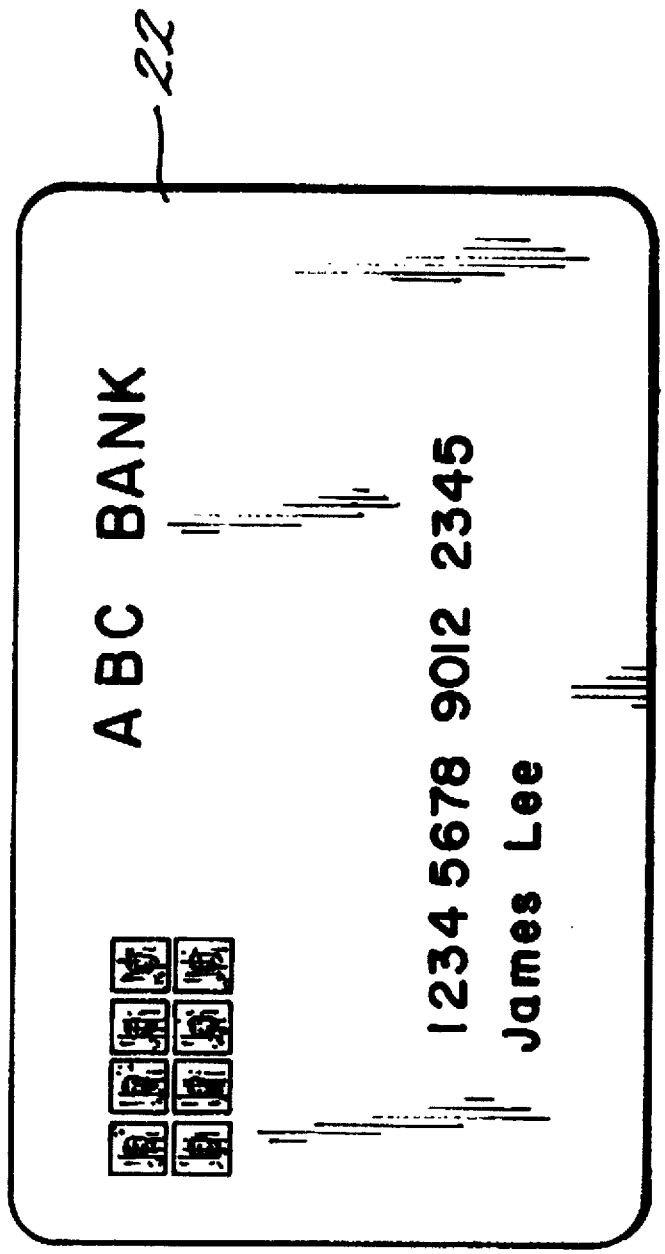
FIG. 2A is a diagrammatic view of an identification (ID) card having composite images disposed thereon.

In a training procedure of the first layer 52, the input image is compared with stored reference images (i.e., weights) displayed at the nonlinear JTC input 58 by means of cross-correlation. If the degree of similarity is below a threshold, the input is added into the weights to create a new reference image. Updated weights will be used to test a new input and the process is repeated. The input is compared with reference images either sequentially or in parallel. Parallel implementation reduces the training time. However, the parallel implementation is limited by the available dynamic range and space-bandwidth product of the input spatial light modulator 58. For example, if a liquid crystal television 58 is used to display the weights, it can only handle a limited number of images as weights. The weights can be superimposed as clusters to form a composite image to be displayed at the input liquid crystal television 58. The number of superimposed images is limited by the gray scale level of the liquid crystal television 58. If a liquid crystal television 58 with 4 bits gray scale is used, then at most eight images can be superimposed for such a composite image. Referring to FIG. 2A, in order to overcome this limitation, the composite images 20 (i.e., weights) can be stored on an optical film and positioned directly in the system or as shown in the FIG. 2A disposed on, for example, an ID card 22, which is to be positioned in the system. The optical film may be comprised of a DuPont or Polaroid photo polymer having a large storage capacity. The composite images stored on an optical material can be fabricated by a variety of materials and techniques, such as photopolymers, photorefractive materials embossing techniques and diffractive optics, as are known. The images can be recorded onto a, so called, "thick" optical material. A thick optical material has a thickness which is at least several times the wavelength of the light used to record the image onto the material, e.g., similar to volume holography. See generally, Fundamentals of Photonics, by B. B. A. Saleh and M. Teich, Wiley, 1992 and Introduction to Fourier Optics, by J. W. Goodman, McGraw Hill, 1968, both of which are incorporated herein by reference. Recording the image onto a thick optical material provides an additional level of security, in that during verification thereof the Bragg condition must be satisfied. Card 22 containing composite images 20 is positioned at the input plane for comparison with the input images, as described above. An important advantage of storing the weights on a card, which is to be carded by the user, is that the system does not require memory for storing the weight, thereby significantly reducing cost. Further, these weights can be stored in spatial phase format and/or a volume hologram which is not viable to the human eye or an intensity sensitive detector and cannot be easily copied by known conventional methods.

For parallel implementation, weight images are grouped into clusters of M images each. The image in one cluster form a composite image. An advantage of using clusters is that the input is not compared with individual weight images but it is compared in parallel with the composite image in the cluster. When a new input is to be added to or subtracted from the weights, only the corresponding composite image needs to be retrained. The composite images in each cluster can be simultaneously displayed at the input plane by spatially separating them. The number of images that can be spatially separated at the input is determined by the available input space bandwidth product of the display device and the size of the images.

The weights of the second layer 54 can be determined according to the a-priori probabilities of the input images. It is assumed that the probability of the input images belonging to each cluster is the same. In other words, the various distorted input images are equally likely. Thus, the weights of the second layer 54 are equal. Thus, the outputs of the first layer 52 are nonlinearly transformed and are summed to produce the second layer output. If the input distortions, used to train the clusters, are not equally likely, the weights of the second layer 54 can be adjusted according to the a-priori probabilities of the clusters.

Referring to FIGS. 2B and 2C, in the electronic implementation of the first layer of the two-layer neural network, the system consists of a video camera 24 and a personal computer interfaced with a frame grabber board 26, as is known. The facial images are captured by camera 24 and stored in memory 28 (e.g., a video tape, in the computer memory, on optical film or optical memory of a card as described above). The system includes a training mode 27 and a recognition mode 29, discussed herein. The captured images are generated during the training mode as the composite images of the neural networks. The input image 30 is compared with the stored composite images 32 in the recognition mode. The comparison is conducted by running a computer program designed to simulate a nonlinear JTC, i.e., a nonlinear filter, illustrated at 34 and 36. Prior to comparing the composite images and the input image, they are transformed by fast Fourier transforms 38 and 40. Therefore, the output of the stimulated nonlinear JTC is transformed by an inverse fast Fourier transform 42. As described above, the proposed face recognition system is the two layer neural network 50 (FIG. 1). Each element of the hidden layer 54 is the response of the neural networks to the input image when only one cluster is used. The output is the response of the system when all the clusters are used. More specifically, the output is the sum indicated at 44, of the responses of individual clusters passed through a binary or other nonlinearity, indicated at 46. The output of the second layer is compared to a threshold, indicated at 48, to determine recognition.

Figure 2D:
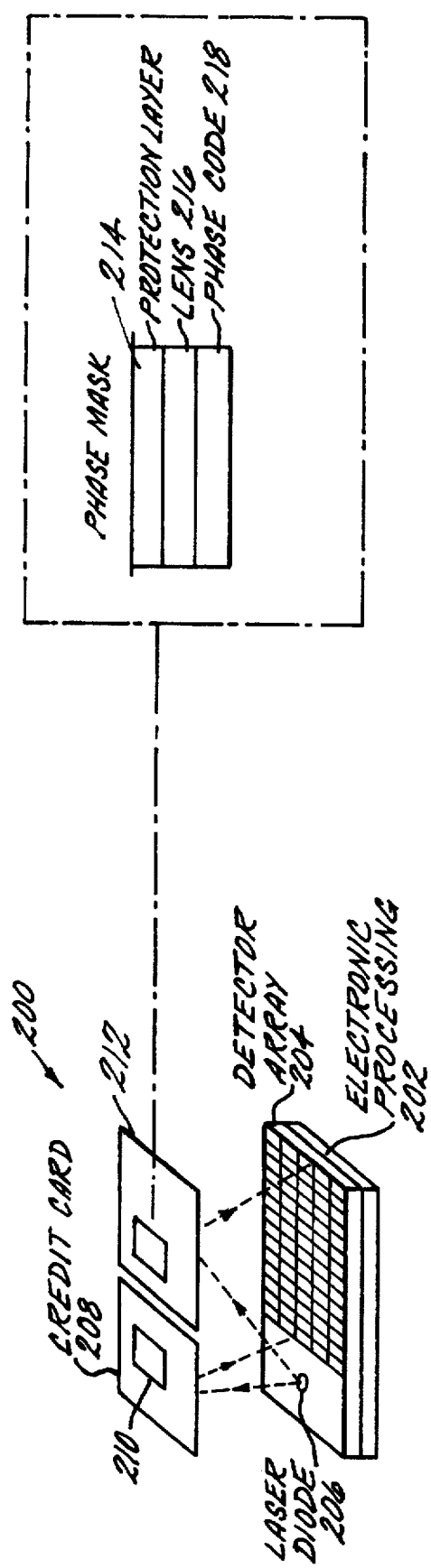
FIG. 2D is a schematic diagrammatic view of a face recognition system in accordance with the present invention.

Referring to FIG. 2D, a compact face recognition system is shown generally at 200. System 200 comprises an electronic processing unit 202, an image detector array 204 (e.g., a CCD array) and a laser diode 206. A card 208 includes reference images 210 thereon, as described above with regard to FIG. 2A. An input facial image is captured by a video camera which is communicated to a spatial light modulator 212, (e.g., a liquid crystal television). A partially coherent beam from laser diode 206 illuminates both a corresponding reference image 210 and the input plane of the spatial light modulator. The spatial light modulator 212 includes a phase mask comprised of a protection layer 214, a lens 216 and a phase code layer 218. During use, the illumination of the corresponding reference image 210 and the spacial light modulator 212 resulting in a combined image on the input plane of array 204 defining a correlated signal. The operation of this embodiment is otherwise the same as that described above with regard to FIGS. 2B and 2C.

Figure 3A:
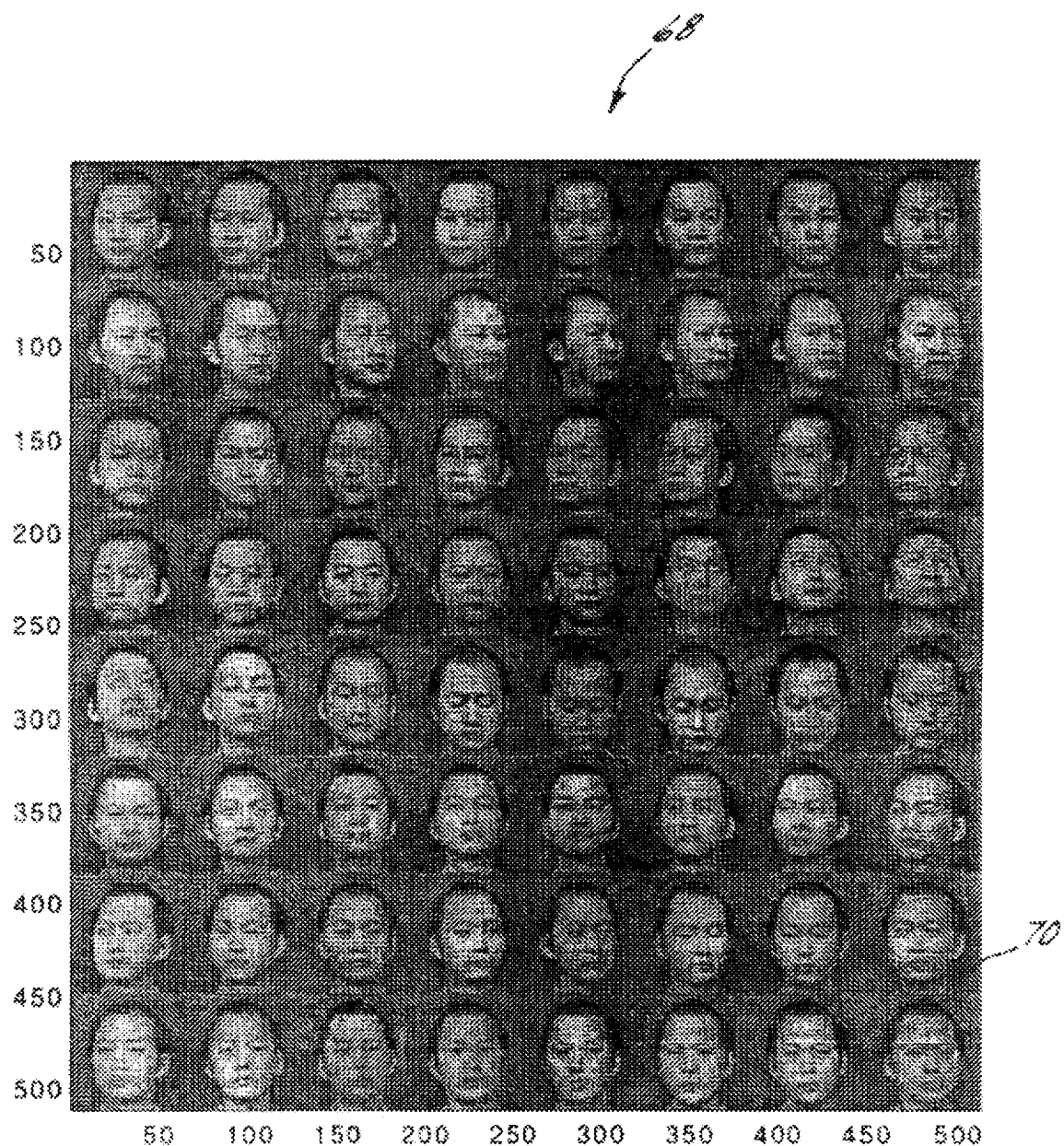
FIG. 3A is representative views of various head perspectives used in the training process in accordance with the present invention.
Figure 3B:
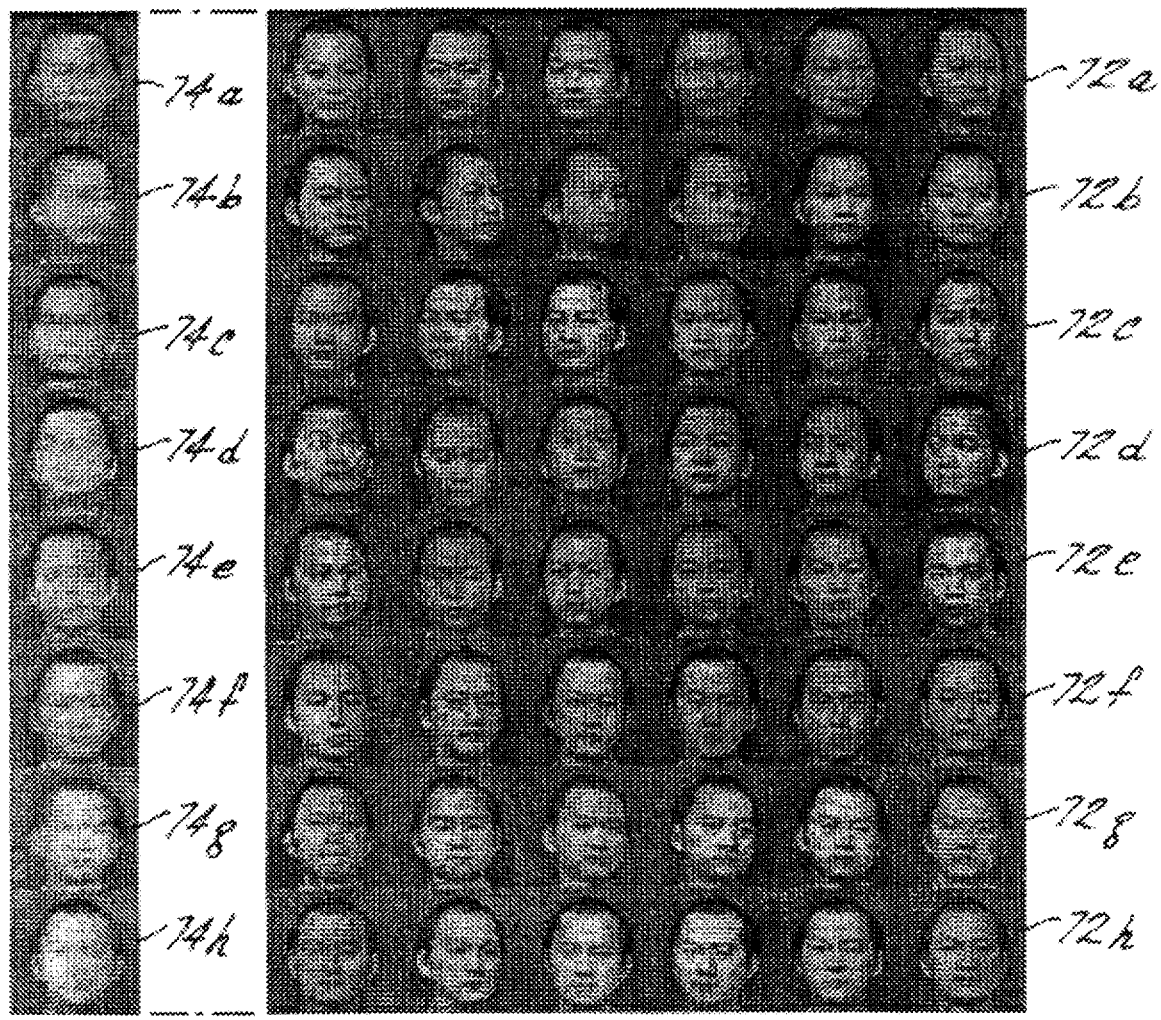
FIG. 3B is selected training sample images and clusters of images used as the weight function in accordance with the present invention.

In the training procedure(designated 27 in FIG. 2B), a total of, for example, one hundred twenty eight facial images including different head perspectives and different facial motions are captured. Referring to FIG. 3A, examples of various head perspectives used for training are shown generally at 68. In this example, each image size is 64×64 pixels which is considered to be sufficient to represent the required facial features for pattern recognition. These images are used as a training set. Sixty-four training samples (images) 70 are shown in FIG. 3A, which are selected during the training procedure and stored into the database (or on an optical film as described above) as the weight images to recognize the face of one person. Referring to FIG. 3B, these training samples or images 70 are grouped into eight clusters 72a-h. Each cluster includes a corresponding composite image 74a-h, to be used as weights, constructed by the six selected reference images.

Figure 4A:
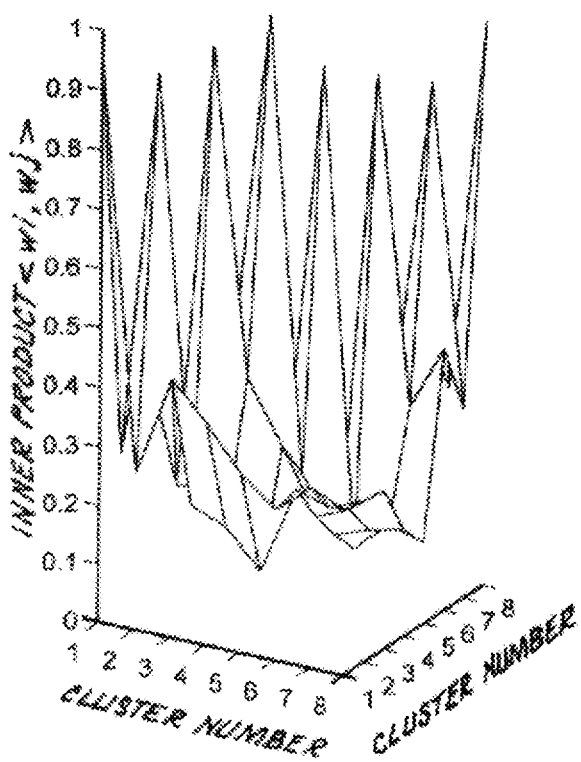
FIGS. 4A and B are correlation plots between the clusters shown in FIG. 3B by using in FIG. 4A a nonlinear kth law JTC with k=0.3 and in FIG. 4B a linear correlator.
Figure 4B:
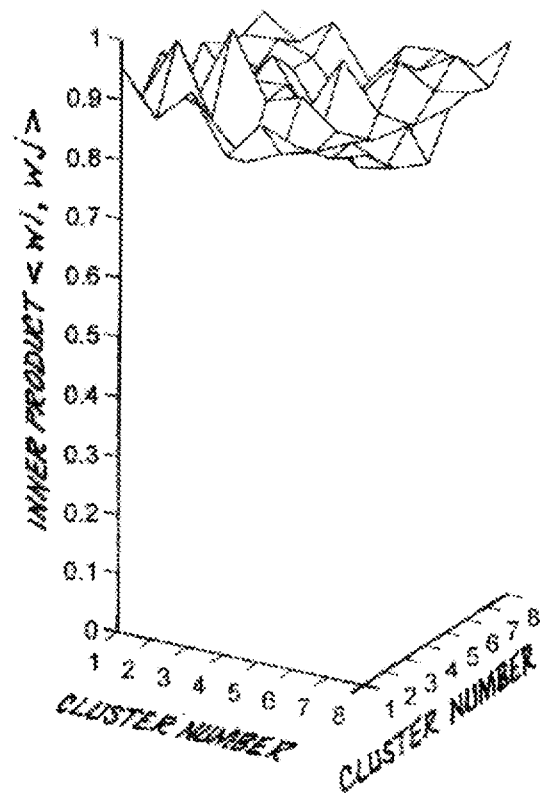

Referring to FIGS. 4A-B, the degree of orthogonality between different clusters is shown. FIG. 4A shows the correlations between eight clusters when a kth law nonlinear JTC, such as described in an article entitled "Nonlinear Joint Power Spectrum Based Optical Correlations", by, B. Javidi, Appl. Opt. vol. 28, pp. 2358–2367, 1989, which is incorporated herein by reference, with k=0.3 is used. FIG. 4B shows correlations between eight clusters when a linear correlator is used. It can be seen from FIGS. 4A–B that the linear correlation exhibits large redundancy between the clusters.

Figure 5:
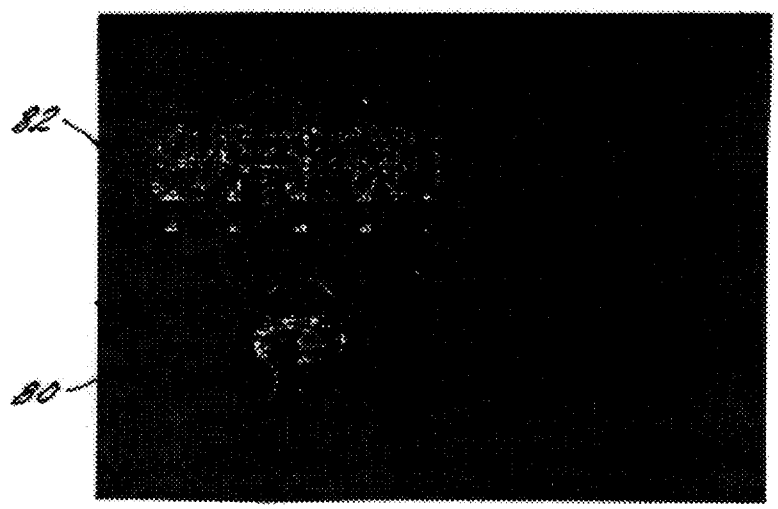
FIG. 5 is representative views showing the effects of the Fourier plane nonlinear transformation on the input image and clusters.

The nonlinear transformation applied to the joint power spectrum essentially preprocesses an input image and clusters before the correlation between them is obtained. Referring to FIG. 5, the effect of the kth law nonlinearity with k=0.3 on an input image 76 and clusters 78 shown in FIG. 7A whose Fourier amplitudes are nonlinearly transformed and Fourier phases are preserved is shown at 80 and 82 respectively. One of the advantages of using nonlinear transformations in the Fourier plane is good light efficiency. The energy of a kth law nonlinearly transformed image 80 is compared with an edge enhanced image obtained by high pass filtering. To obtain the nonlinearly transformed image, a kth law nonlinearity with k=0.3 is applied to the Fourier spectrum of an input image 76 shown in FIG. 7A. To obtain an edge enhanced image of the same image, a dc block is employed in the Fourier plane to filter out the lower spatial frequencies of the Fourier spectrum. The kth law nonlinearly transformed image 80 with k=0.3 has an energy 2000 times larger than the edged enhanced image obtained by high pass filtering.

When the training for a person's images is completed, the system can recognize distortions of the input facial image. The same procedure is used to train the system for other facial images. For classification, the input is compared with the clusters corresponding to various persons. The output response of the neural networks is produced by summing the output peak intensities (i.e., outputs of the first layer 52) resulting from the clusters of a specific person to an input image. The response of the neural networks that exceeds the threshold determines whether the person belongs to the class represented by the clusters.

Figure 6:
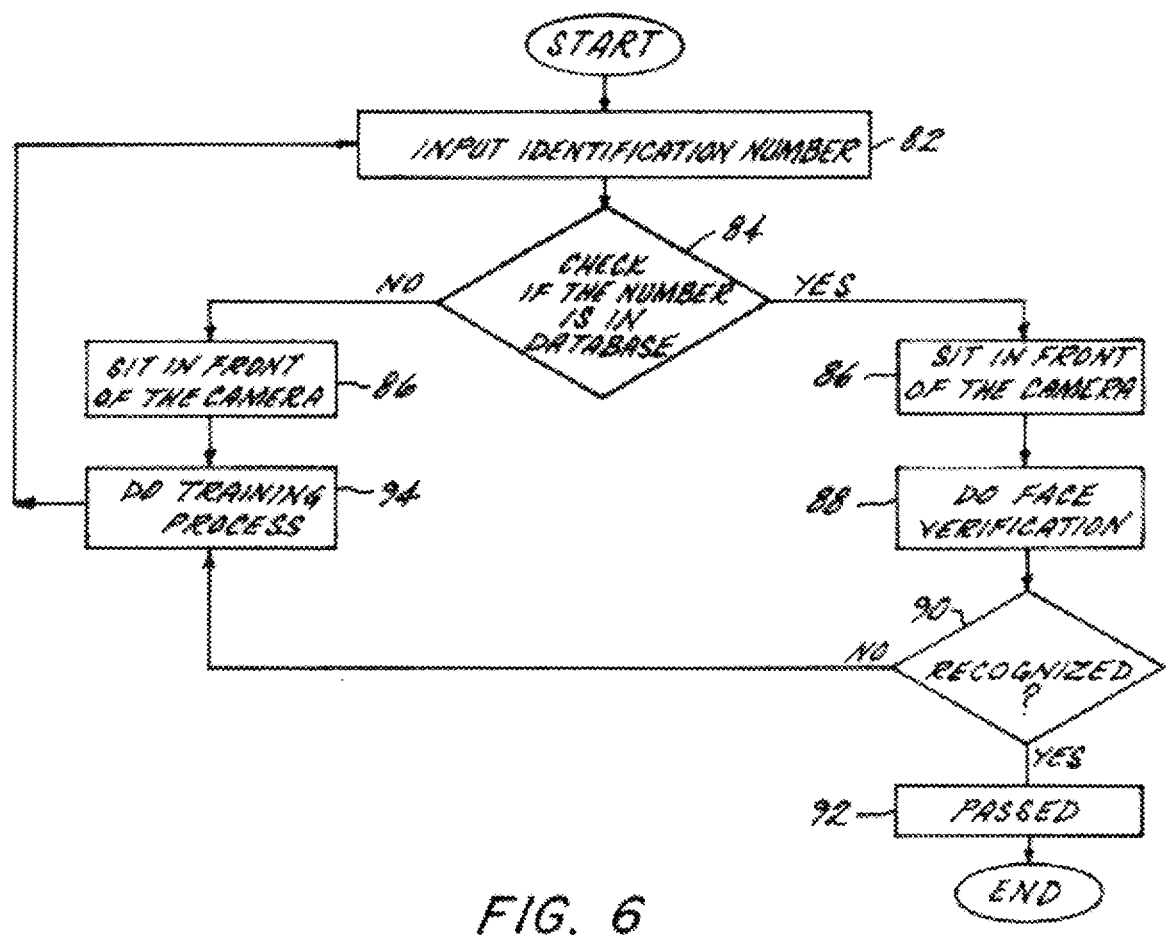
FIG. 6 is a flow diagram of the face identification procedure in accordance with the present invention.

When used in conjunction with a badge or password identification system to confirm an identity, a two class classification system is presented. Accordingly, referring to FIG. 6, a person seeking to pass a security check, enters their name or identification number which is then verified, indicated at 82 and 84, while the camera captures their facial image, indicated at 86. Based on the name or identification number, the corresponding clusters or composite images are compared with the input image, indicated at 88 and 90. If the response of the system exceeds a threshold, the system confirms the identity, indicated at 92, otherwise, the input is rejected, indicated at 90. If rejected the image may be trained, indicated at 94. The input image can be correlated with all the clusters associated with the input identification number in parallel.

Figure 7A:
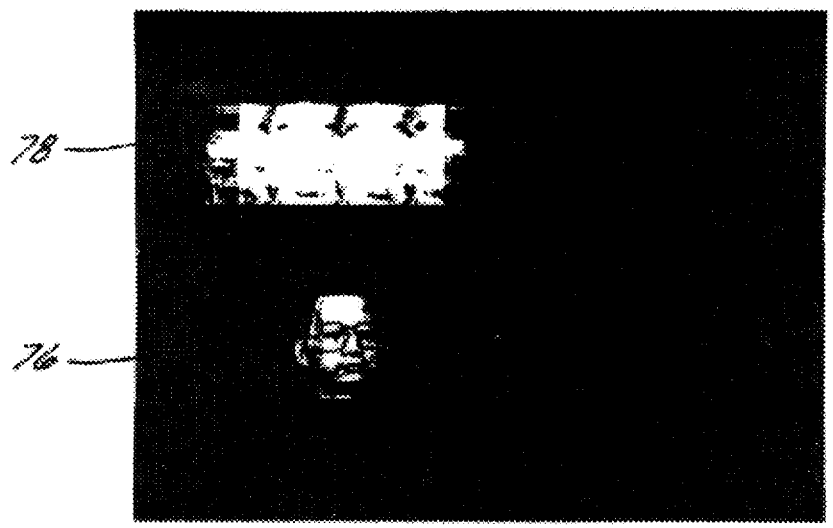
FIG. 7A is representative views showing computer simulations for face recognition.
Figure 7B:
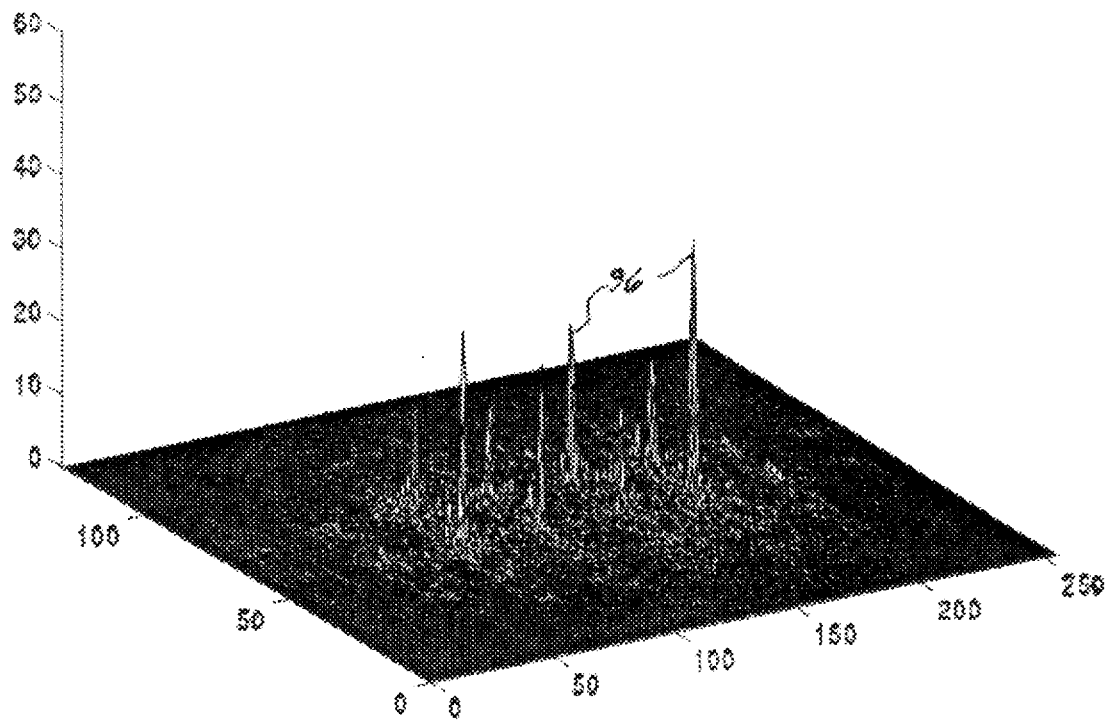
FIG. 7B is a plot of the output plane of the first layer in response to the input image of FIG. 7A.
Figure 8A:
FIG. 8A is respective views at the input plane of the system displaying an input image of class #2 and clusters for class #1.
Figure 8B:
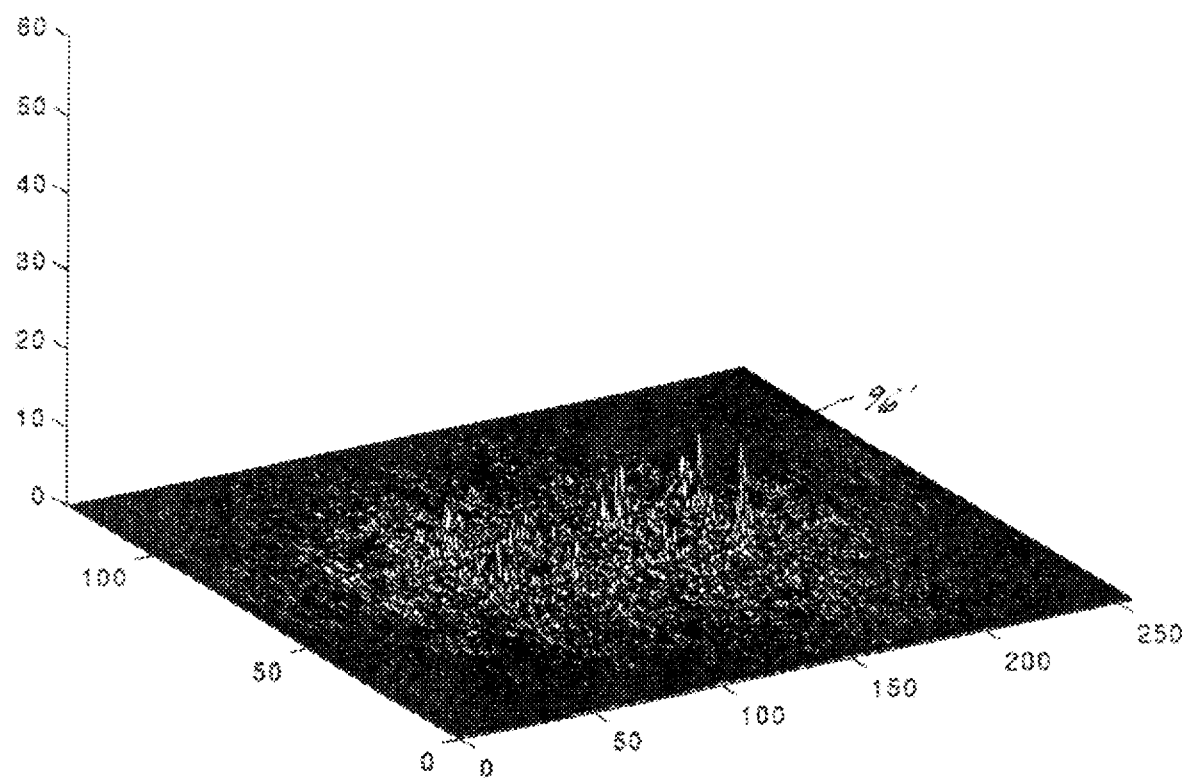
FIG. 8B is a plot of the output plane of the first layer in response to the input image of FIG. 8A.

Referring to FIGS. 7A–B, wherein computer simulation results for face identification are shown. FIG. 7A shows the input plane of the system that displays the clusters 78 for an image class #1 and the input image 76 for class #1, wherein class #1 corresponds to facial images of person #1. The input image 76 shows the person wearing glasses to simulate a distortion not accounted for during the training. The clusters 78 are partially superimposed to make better use of the available input space bandwidth product. As described above, a kth law nonlinear JTC with a nonlinearity k=0.3 is employed. A 256×256 Fast Fourier Transform subroutine is used in the simulations. The photograph and 3-D mesh of the first layer output plane are presented in FIG. 7B. The first layer 52 output contains a number of correlation peaks 96 between the clusters and the input image. When the input is a person #2 as shown in FIG. 8A, the first layer output of the system has a low response as shown in FIG. 8B, wherein corresponding elements are identified by a primed number.

Figure 9A:
FIG. 9A is representative views of various distorted facial images of class #1 used as input images in testing the neural networks of the present invention.
Figure 9B:
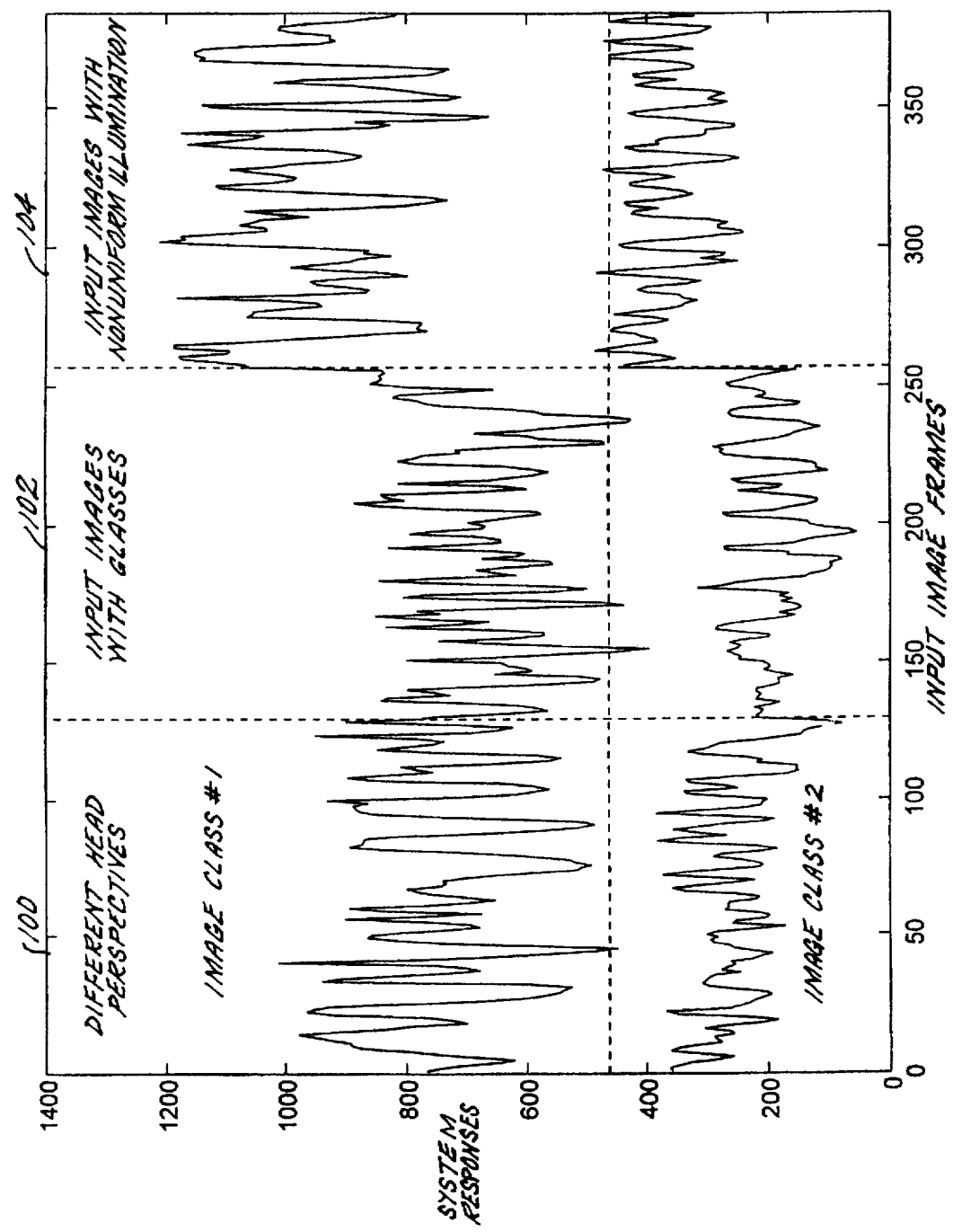
FIG. 9B is plots of the neural networks response to facial images of class #1 and class #2 with different head perspectives and various distortions and with clusters or weights for class #1 are used in the tests.

Examples of various distorted facial images of class #1 used in testing the neural networks are shown in FIG. 9A. The system response or the output of the second layer 54 in response to distorted facial images of class #1 and class #2 with different head perspectives and various distortions are shown in FIG. 9B. Class #2 corresponds to facial images of person #2 in FIG. 8A. In this example, the network is trained to recognize class #1, that is, the clusters 78 for class #1 are used as the weights. The system output response is calculated by summing the first layer 52 output peak intensities that exceed an intensity threshold. Region 100 of the plots in FIG. 9B is the system responses to input facial images with different head perspectives. Region 102 of the plots in FIG. 9B is the system response with the input images wearing glasses and having different head perspectives. Region 104 corresponds to the case when the input light is illuminating the face non-uniformly from the top and from the sides. During the training, a uniform input light is illuminating the front of the face. It will be appreciated that the system is capable of handling the non-uniform illumination and various distortions.

Figure 9C:
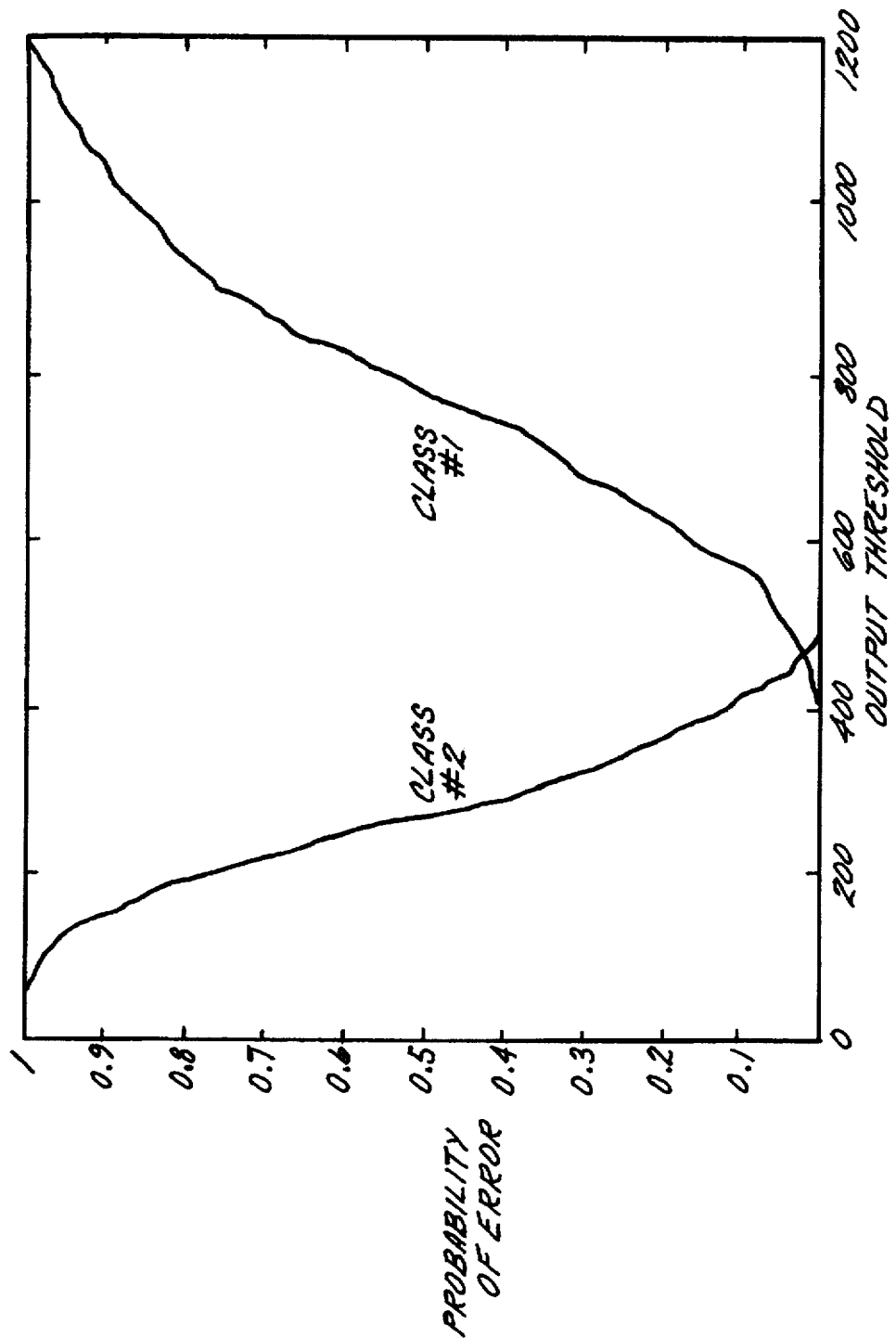
FIG. 9C is a plot of the error probability versus the output threshold level.

The classification of images is dependent on thresholding of the second layer 54 output. A plot of the error probability versus the second layer output threshold level is shown in FIG. 9C. With an output threshold level of 460, the overall error probability of the system is about 2%.

Figure 10A:
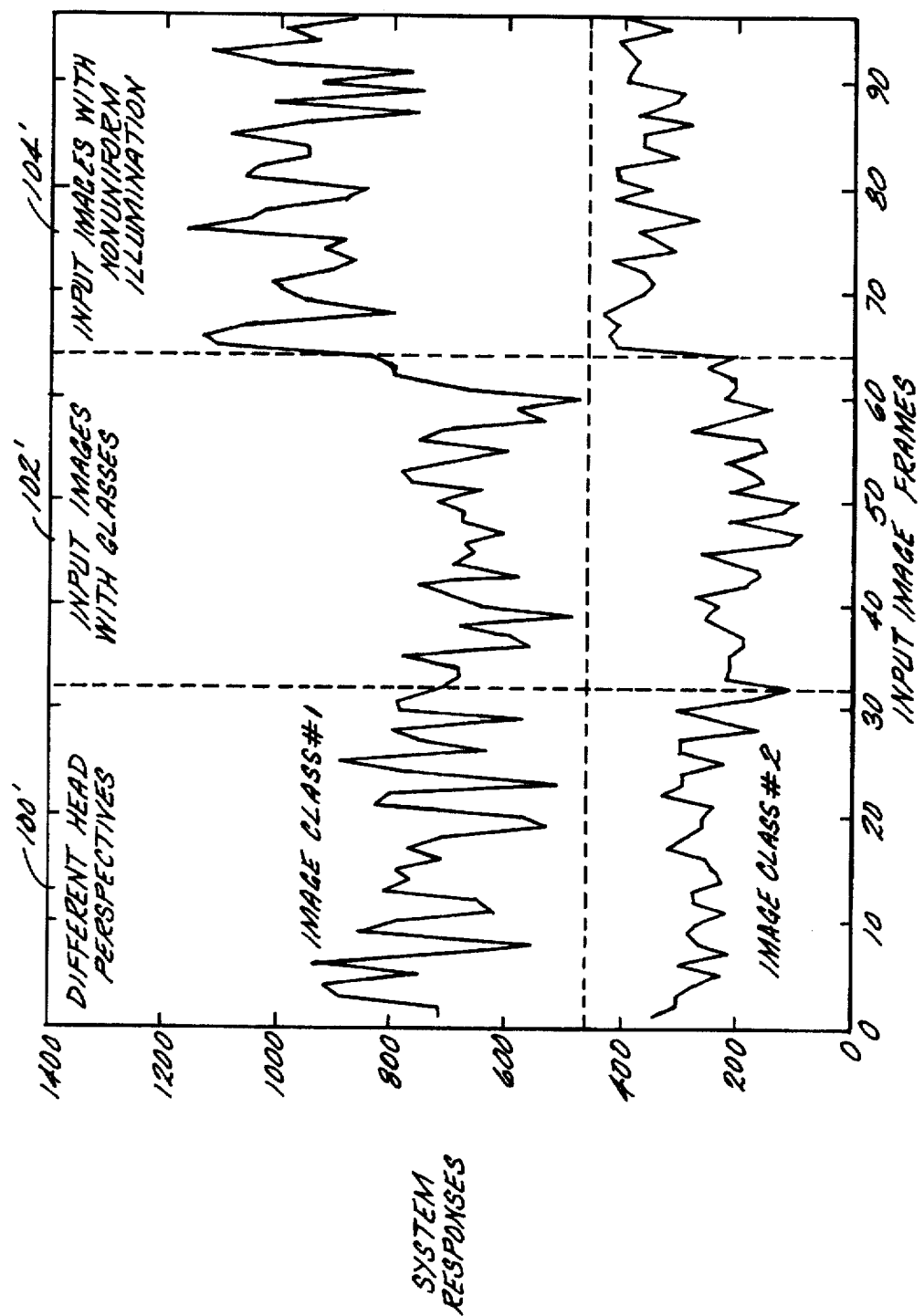
FIG. 10A are plots of the neural networks response to facial images of class #1 and class #2 with different head perspectives and various distortions using time multiplexing of the input image to reduce the probability of error with clusters or weights for class #1 are used in the tests.
Figure 10B:
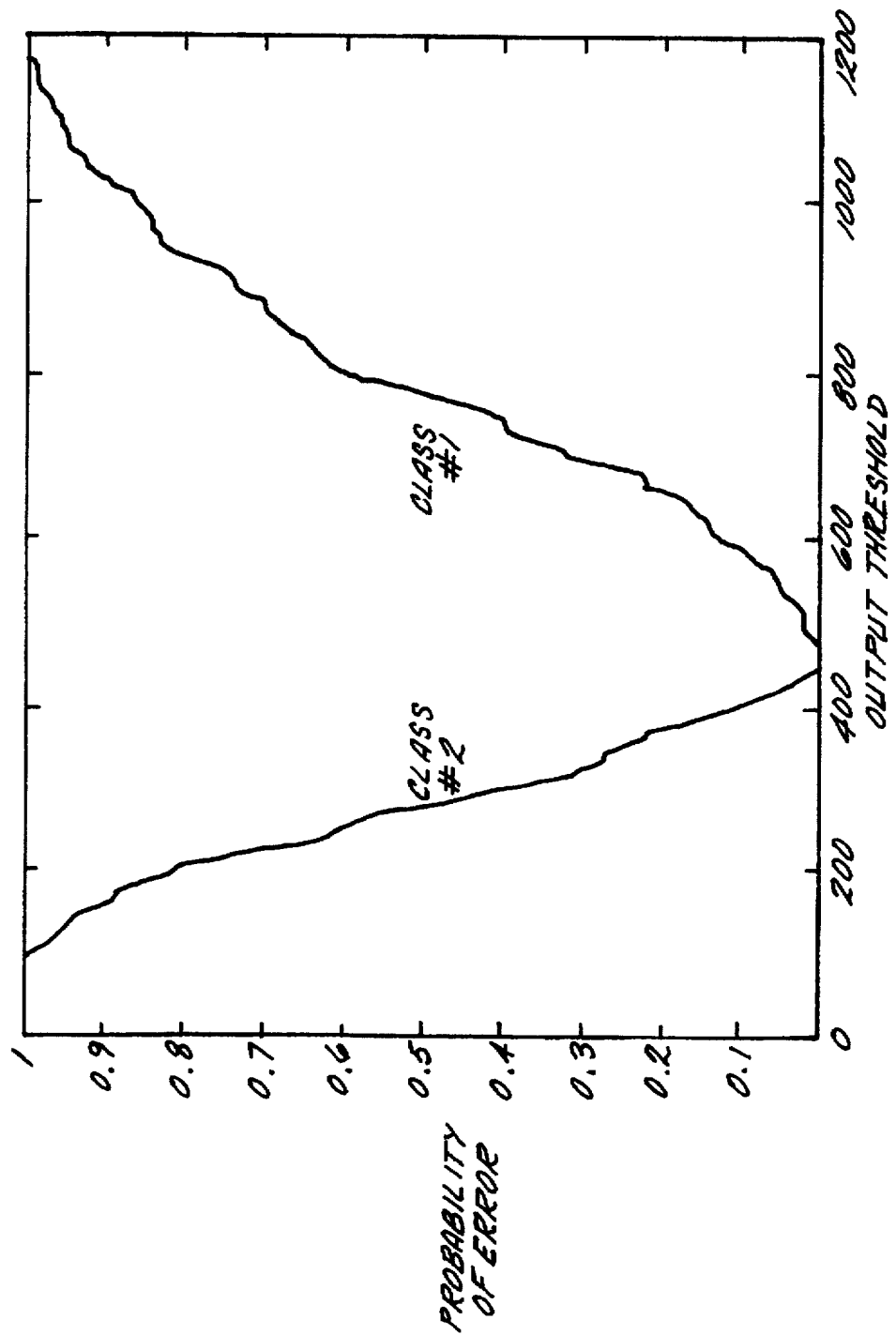
FIG. 10B is a plot of the error probability versus the output threshold level.

The performance of the system can be improved by using the time multiplexing of the input images of the same person. The output response of the system is determined by examining more than one input image to classify that image. Using time multiplexing of the input image, the output response of the system is the average of the system's response to four (in the present example) distorted input images of the same person. In accordance with which, referring to FIG. 10A, the system response or output of the second layer 54 is shown in response to facial images of class #1 and class #2 with different head perspectives (region 100') and various distortions (regions 102' and 104') when time multiplexing of the input images is used. Referring to FIG. 10B, the corresponding plot of the probability of error versus the second layer output threshold level is shown. With an output threshold level of 460, the overall probability of error of the system using time multiplexing is reduced to zero.

Figure 11A:
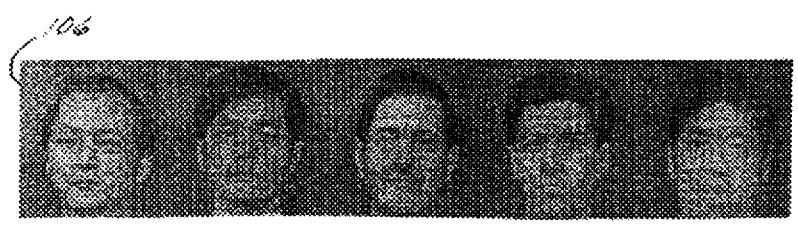
FIG. 11A are representative views of input images from five image classes with the neural networks programmed to recognize class #1.
Figure 11B:
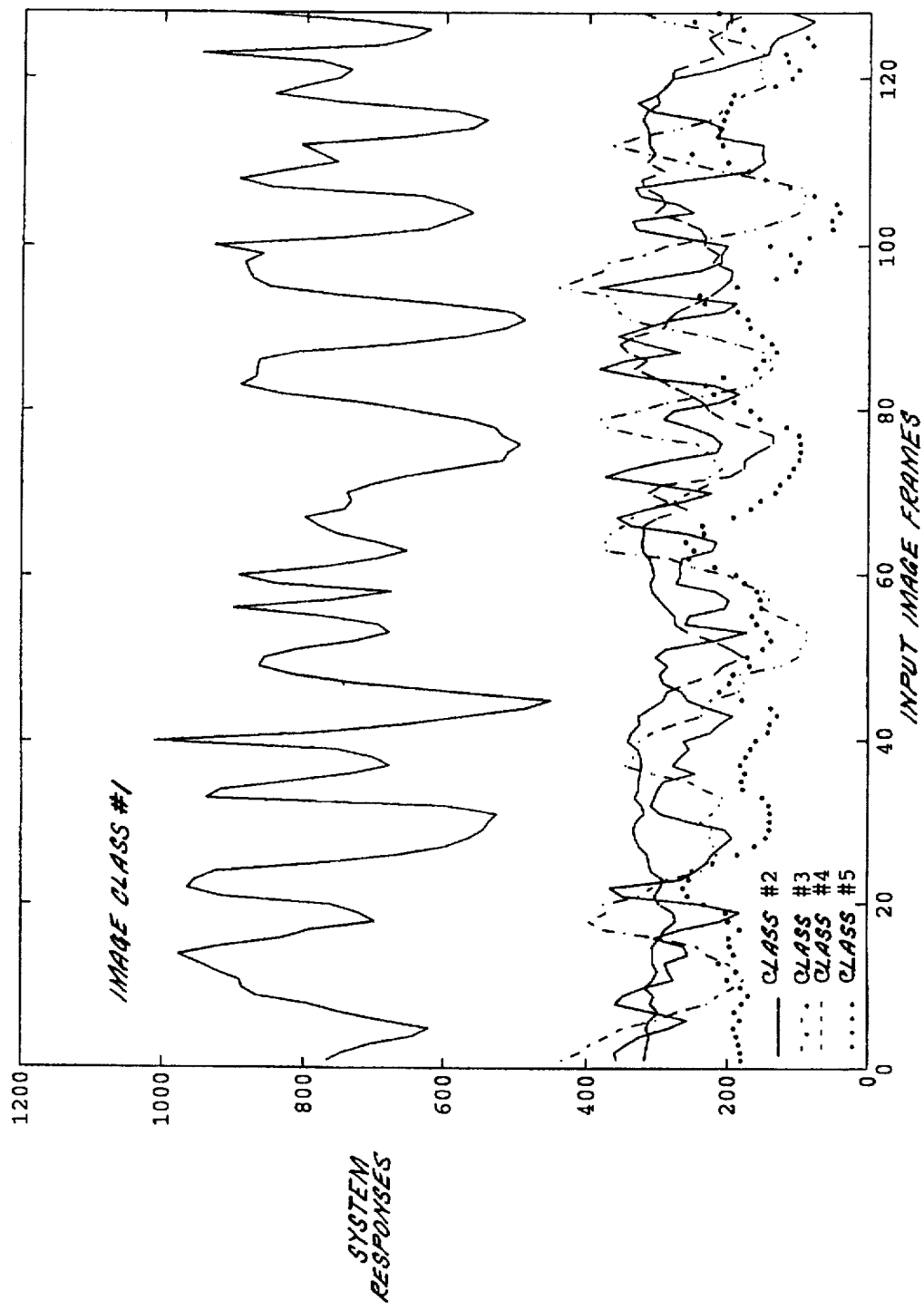
FIG. 11B are plots of the system response to facial images of class #1–#5.
Figure 11C:
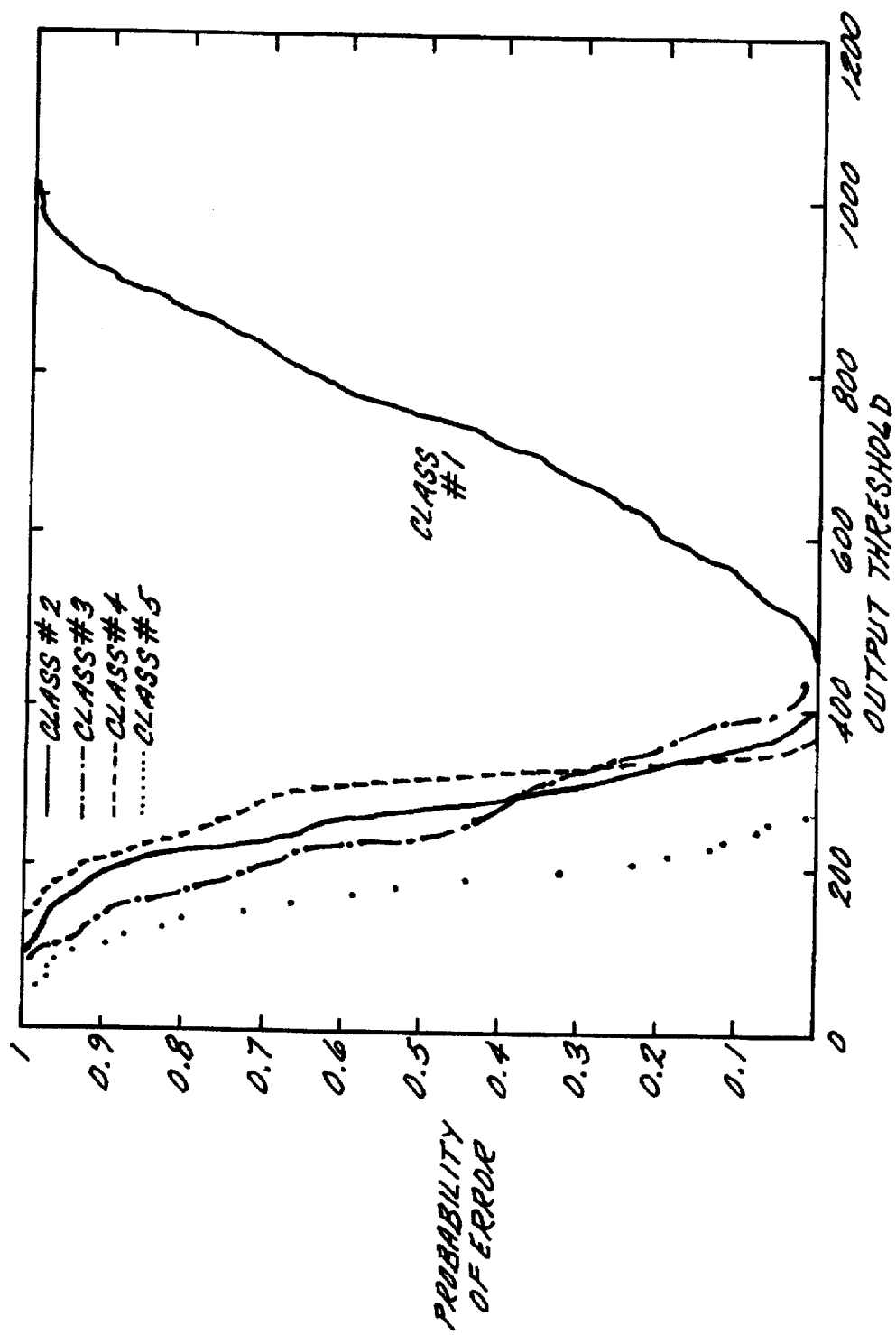
FIG. 11C are plots of the error probability versus the output threshold level.

Once the system is trained with a specific image class, it will recognize the images in that class and reject images from other classes. Referring to FIG. 11A, examples of five input images (i.e., classes #1–#5) are shown. In this example, clusters of image class #1 are used as the weights. Input image 106 (i.e., class #1) is person expected to be recognized. The system response to facial images of classes #1–#5 are shown in FIG. 11B. Referring to FIG. 11C a corresponding plot of the probability of error versus the second layer 54 output threshold level when the distorted input images are selected from the five classes. The input distortions are different head perspectives. With a threshold level of 460, even without using time multiplexing the system can easily distinguish or classify image class #1 from other image classes with a probability of error of zero.

Figure 12A:
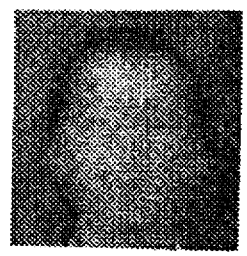
FIG. 12A is a composite image generated using a correlator.
Figure 12B:
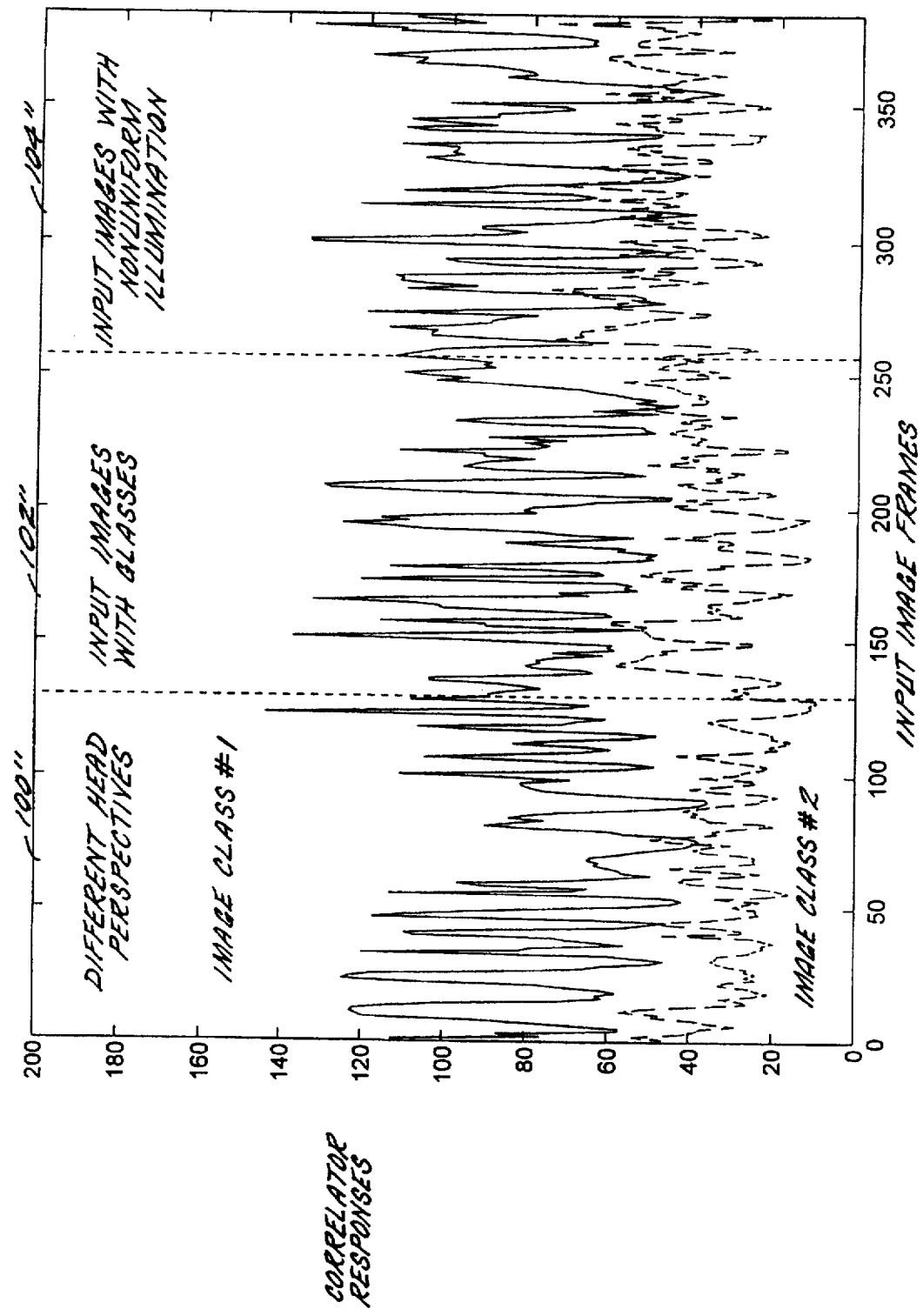
FIG. 12B are plots of the correlator response to facial images of class #1 and class #2 with different head perspectives and various distortions when the composite image in FIG. 12A is used.
Figure 12C:
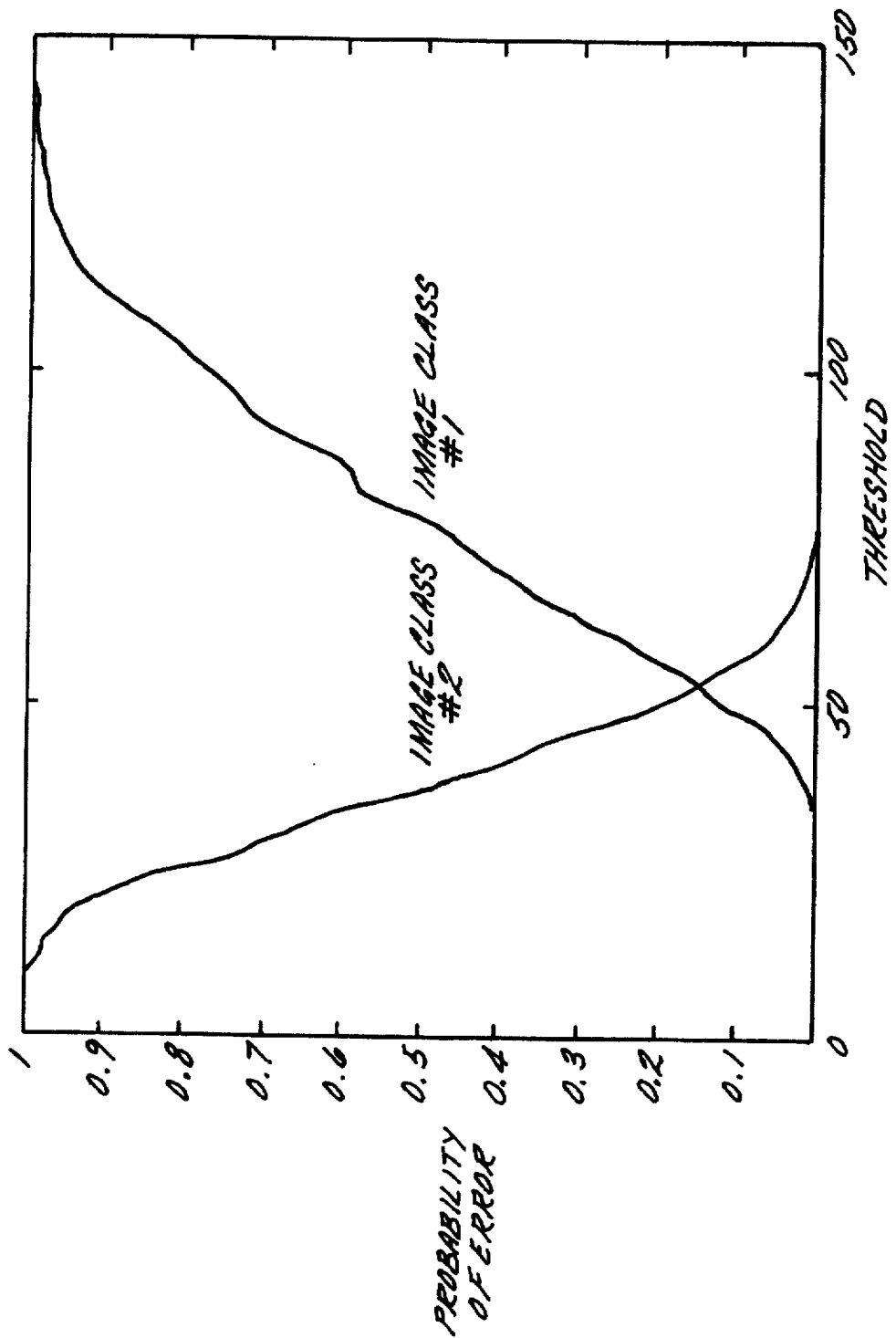
FIG. 12C are plots of the correlator error probability versus the correlator output threshold level.

The benefits of the present invention are readily apparent when the performance of the neural networks pattern recognition system of the present invention is compared to a prior an correlator system. When only one channel (cluster or composite image) is used, the response of the system is a correlation between the input image and the composite image. The composite image is produced by averaging the same forty-eight input images (FIG. 3 A) in the training set of class #1 that were used to construct the weight function for the neural networks system described above. Referring to FIG. 12A, a composite image consisting of the forty-eight reference images is shown. Referring to FIG. 12B, the correlator output is shown for facial images of class #1 and class #2 with different head perspectives (region 100") and various distortions (regions 102" and 104") when the composite image in FIG. 12A is used. A plot of the probability of error versus the output threshold level the correlator is shown in FIG. 12C. From FIG. 12C it is clear that the smallest obtainable overall probability of error of the system is about 15%, which is significantly greater than the probability of error produced by the neural networks system described above.

Figure 13:
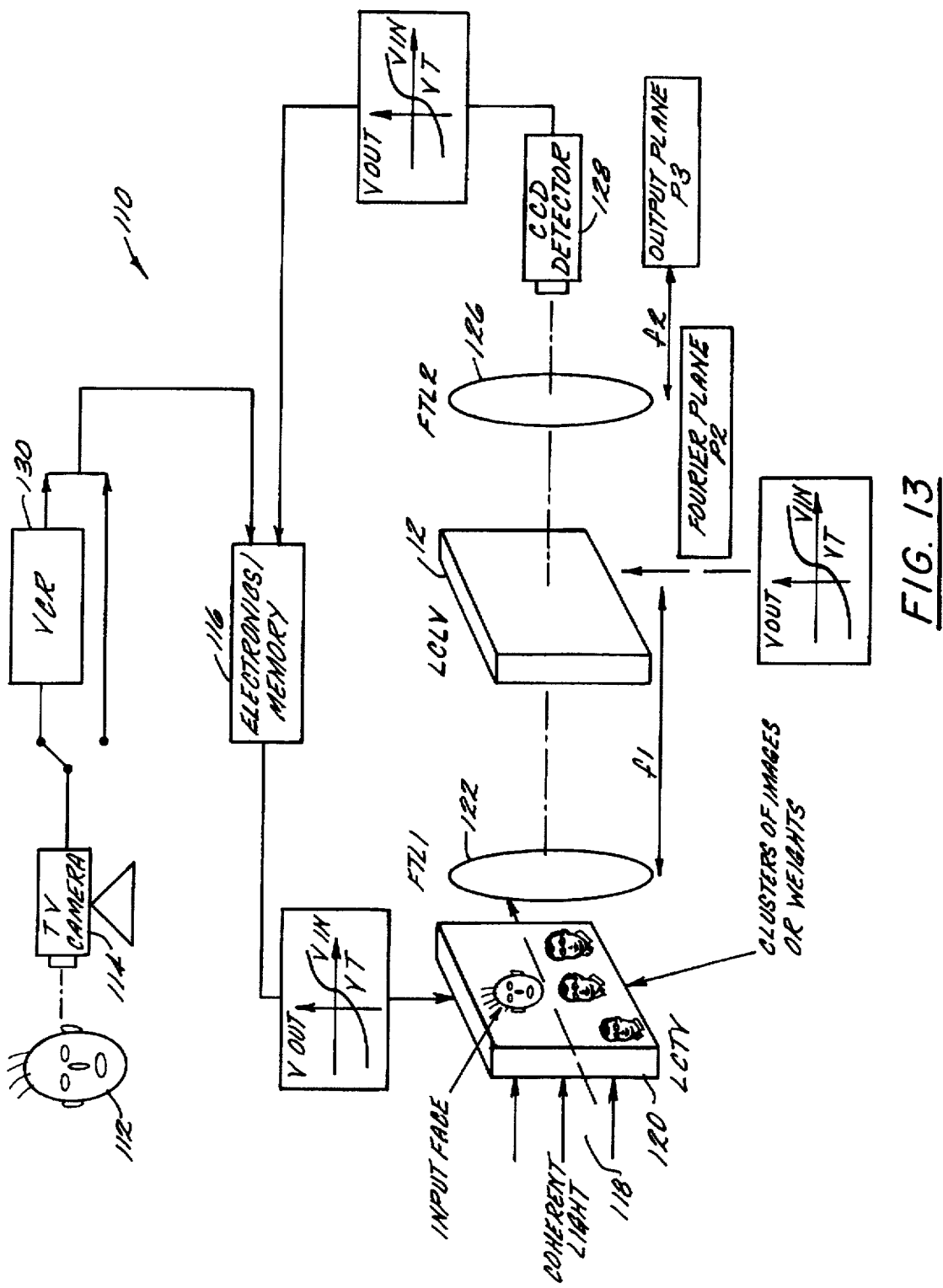
FIG. 13 is a schematic block diagram of the optical implementation of neutral networks for face recognition in accordance with the present invention.

Referring now to FIG. 13, optical implementation of the neural networks for face recognition in accordance with the present invention is shown generally at 110. An input facial image 112 is captured by a video camera 114 that is interfaced with a computer 116. A coherent collimated beam 118 from an argon ion laser (e.g., having a wavelength $\lambda=514$ nm) illuminates an input plane liquid crystal television 120 containing the weight images or clusters and the input facial image under investigation. The liquid crystal television 120 preferably has 320×220 pixels and has an aperture size of 2.5×2 cm². A first Fourier transform lens 122 with a long focal length (e.g., fl=2000 nm) is positioned after the liquid crystal television 120. A lens with long focal length is used because of the limited resolution of a liquid crystal light valve 124 placed in the Fourier plane and to remove the higher order diffracted terms produced by the grid structure of the input liquid crystal television 124. A He—Ne laser beam (e.g., having a wavelength $\lambda=633$ nm) is expanded, collimated, and used as the read-out beam (not shown) of the liquid crystal light valve 124. In this example, the intensity of the read-out beam is approximately 25 $\mu W/cm^2$ over the aperture size of 25×25 mm² of the liquid crystal light valve 124. A second Fourier transform lens 126 with a focal length of f2=400 mm is positioned alter the liquid crystal light valve 124. The correlation outputs (first layer output 52) are detected with a CCD detector 128 interfaced with computer 116 to train the system.

Figure 14A:
FIG. 14A are representative views at the input plane of the system displaying input image of person #1 and one of clusters for class #1.
Figure 14C:
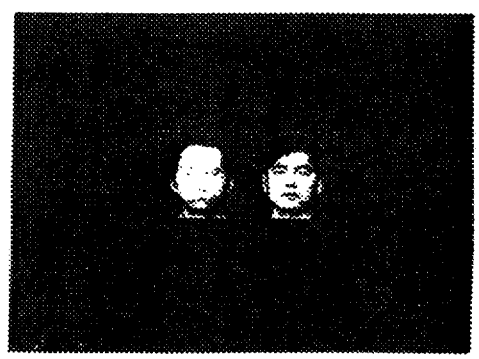
FIG. 14C are representative image of person #2 and one of clusters for class #1 at the input plane of the system displaying input.
Figure 14B:
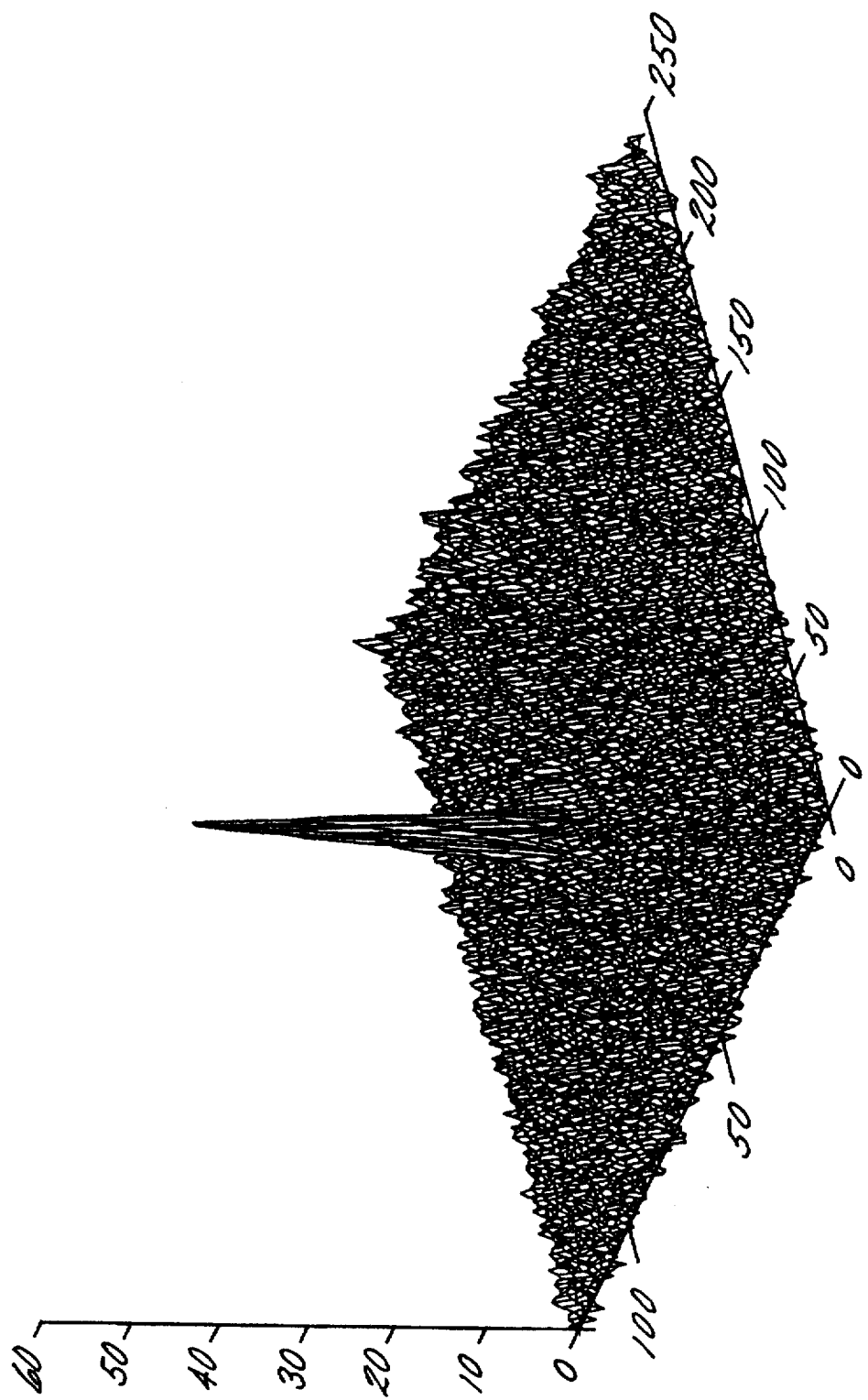
FIG. 14B is a plot of the output plane of the first layer for the cluster and the input image of FIG. 14A.
Figure 14D:
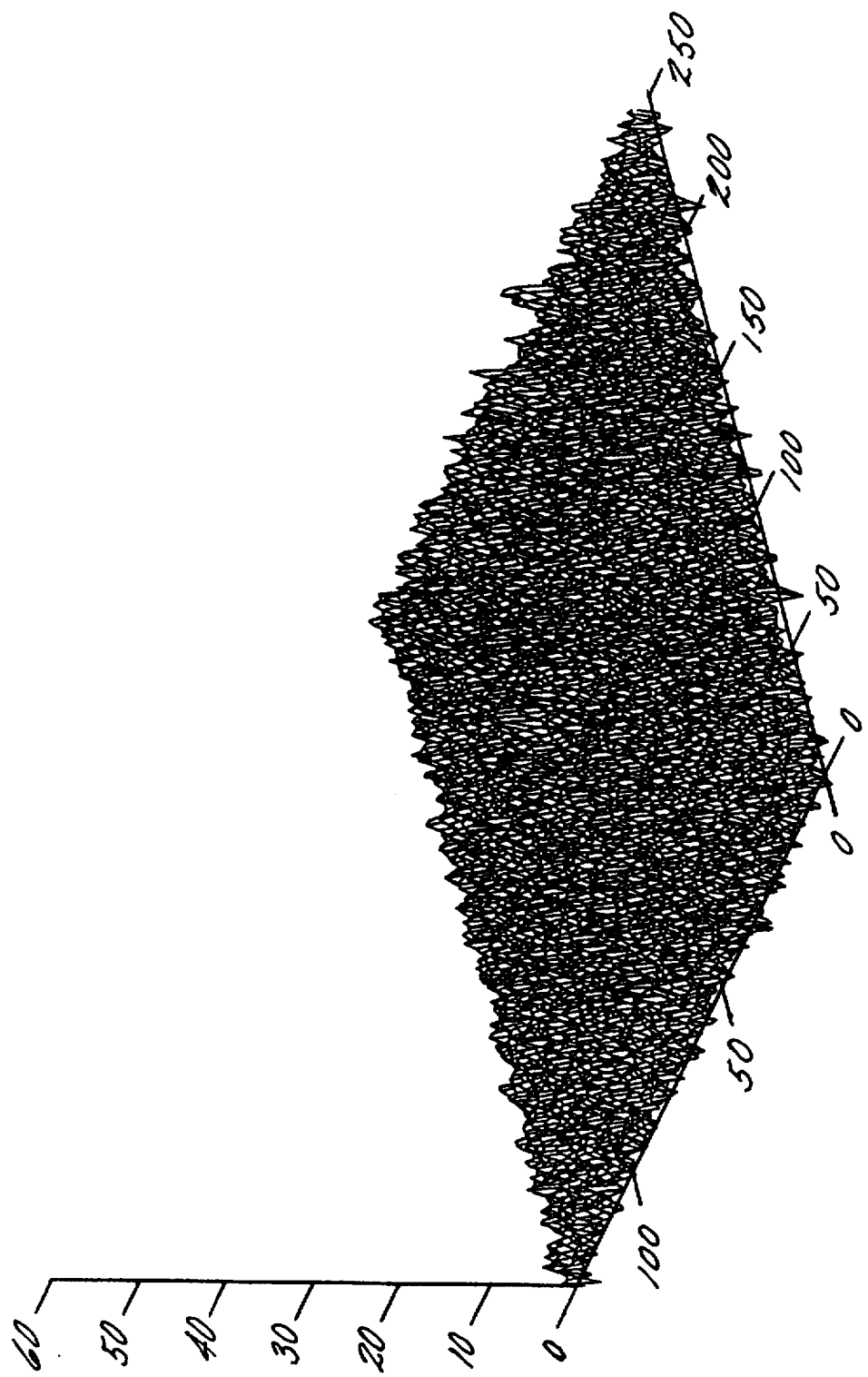
FIG. 14D is a plot of the output plane of the first layer for the cluster and the input image of FIG. 14C.
Figure 15A:
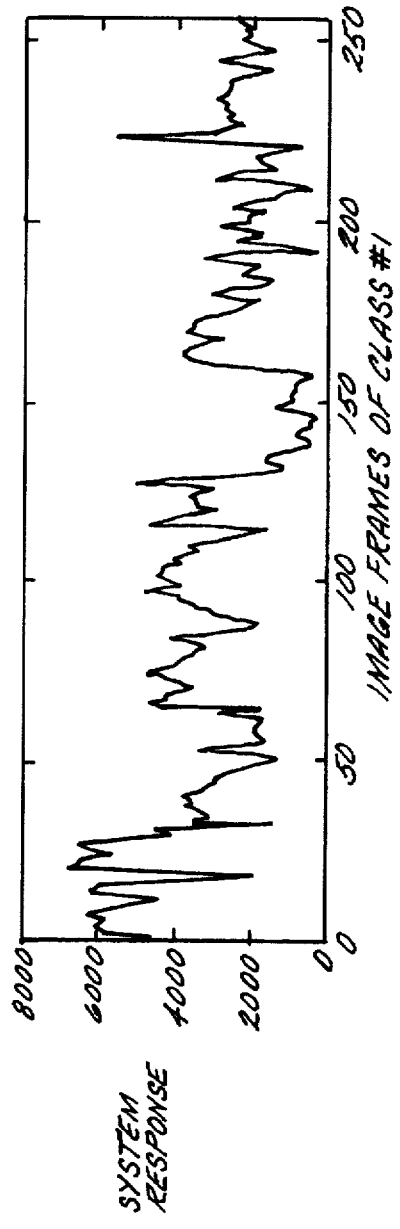
FIG. 15A is a plot of the system responses to facial images of class #1 for the optical neural networks with different head perspectives and distortions and with clusters for class #1 used in the tests.
Figure 15B:
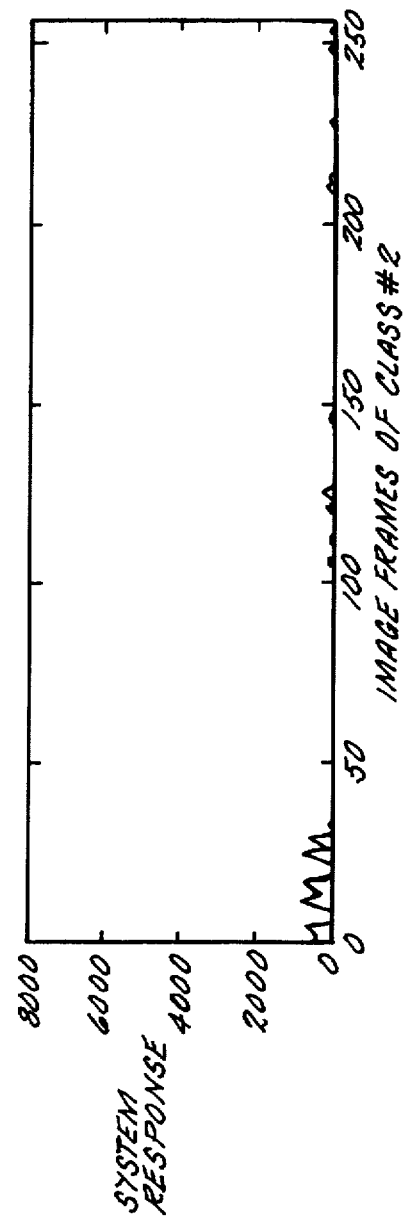
FIG. 15B is a plot of the system responses to facial images of class #2 for the optical neural networks with different head perspectives and distortions and with clusters for class #1 used in the tests.
Figure 15C:
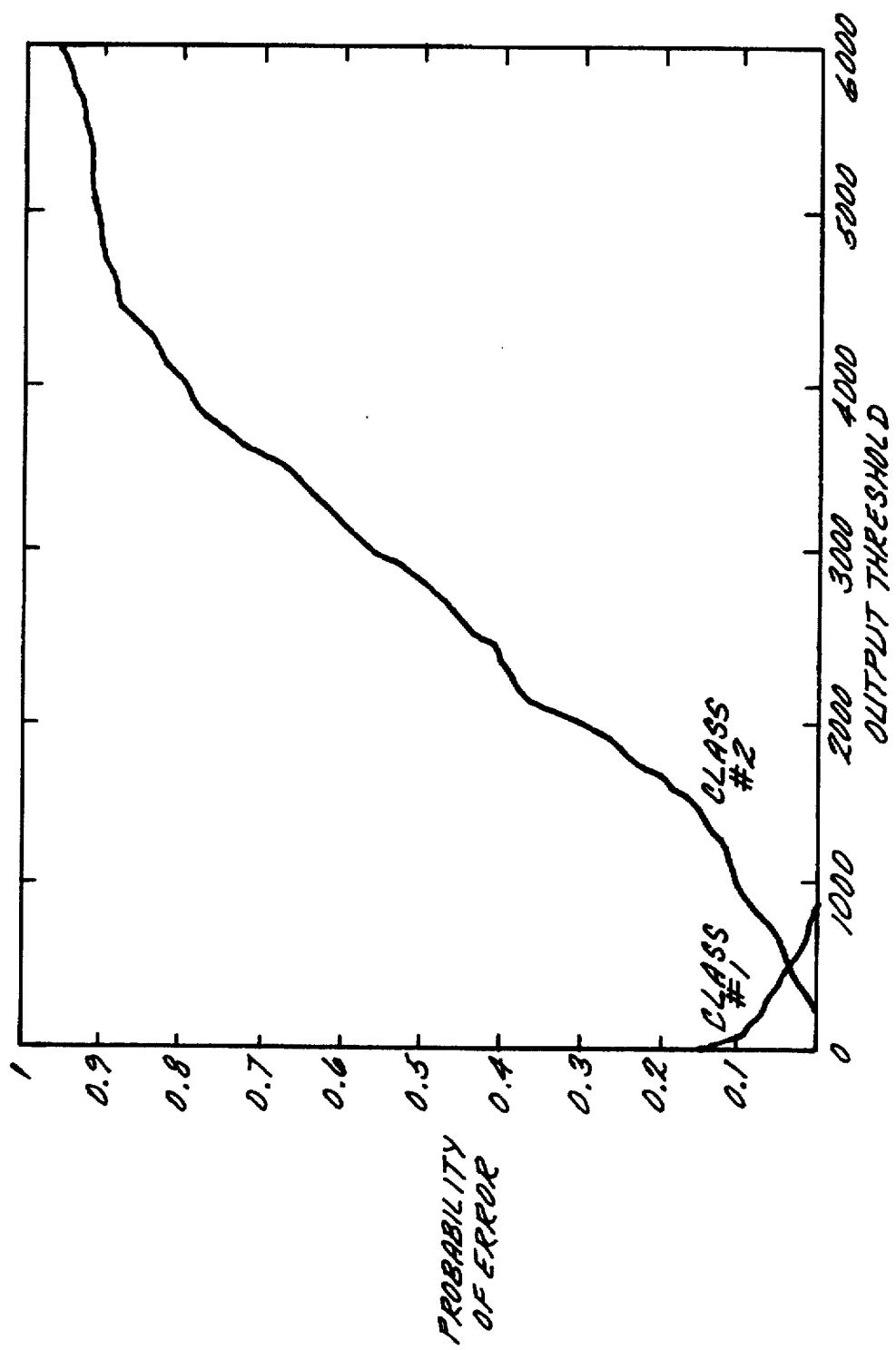
FIG. 15C are plots of the error probability versus the second layer output threshold level.

The training procedure and classification using the optical system 110 shown in FIG. 13 is similar to that used in the electronic implementation. The nonlinear filtering of the input image using the clusters is produced by the nonlinear JTC. The input image is correlated with all the clusters sequentially due to the limited dynamic range and limited resolution of the liquid crystal television 124. The dynamic range of the liquid crystal television 124 is about 8 gray scale levels and the space bandwidth product is 320×220 pixels. This limitation can be overcome by positioning an optical film, which may disposed on a card, having the composite images thereon in the system, as described hereinbefore. The clusters are the composite images each consisting of six facial images of the training set, as described hereinbefore. The clusters are trained off-line by using digital methods also described hereinbefore. Alternatively, the clusters can be trained optically. In the classification procedure, the input is a distorted facial image taken directly from the video camera 114 or from the video tape in VCR 130. In each comparison, the input image and one of the composite images are displayed on the liquid crystal television 124, as shown in FIG. 14A. In this FIGURE, the cluster belongs to the composite image of class #1 and is constructed by six images. The input is in class #1, and is different from the images used for the training. The size of the input image and each cluster is 64×64 pixels. The separation between the input image and the cluster is 64 pixels. The first layer 52 output for one cluster is shown in FIG. 14B. The first layer outputs for eight clusters of class #1 are passed through a binary nonlinearity and are summed electronically to obtain the response of the system or the second layer 54 output. Since the response of the system exceeds the threshold, the input is identified to be class #1. When the input is in class #2 and the clusters belong to class #1, the response of the system is below the threshold. As a result, the input is identified not to be class #1. FIG. 14C shows the input image for class #2 to be classified and one of the clusters for class #1 displayed on the input liquid crystal television. FIG. 14D shows the first layer 52 output for the input shown in FIG. 14C. FIGS. 15A-B show the optical neural networks response to facial images of class #1 and class #2, respectively. The input images have different head perspectives, wearing glasses, and have nonuniform illumination, as described hereinbefore. In these plots (FIGS. 15 A-B), the unit of the optical neural networks response is in nW. In both cases, clusters (weights) for class #1 are used. The optical neural networks error probability versus the output threshold level is shown in FIG. 15C. With a threshold level of 500 nW, the system can classify class #1 and class #2 with a probability of error of less than 3%.

Figure 15D:
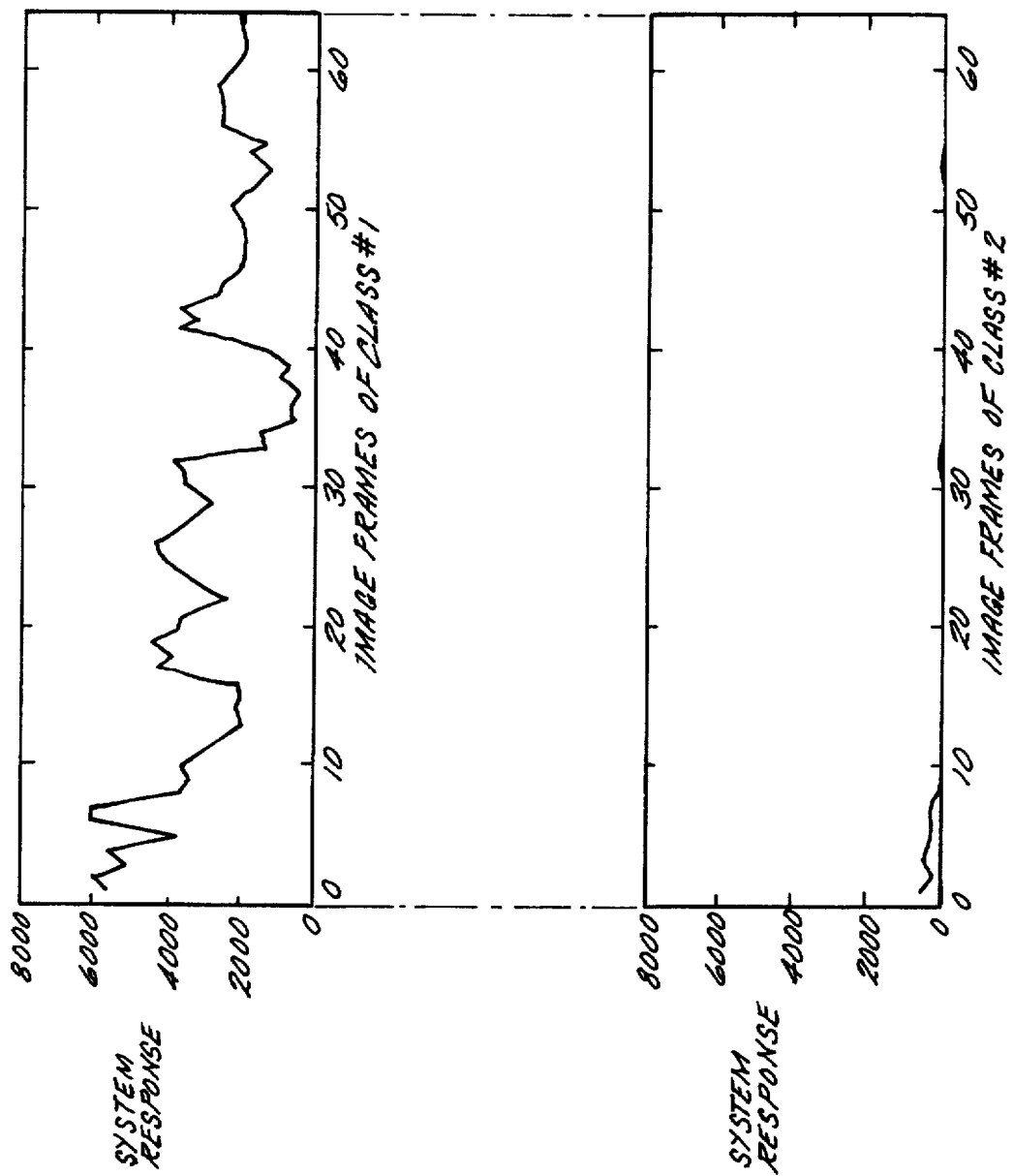
FIG. 15D are plots of the optical neural networks response to facial images of class #1 and class #2 when time multiplexing of the input images is used.

The performance of the system can be improved by using time multiplexing of the input images of the same person, as described hereinbefore. With time multiplexing of the input image, the output response of the system is the average of the system's responses to four distorted input images of the same person. FIG. 15D shows the optical neural networks response to facial images of class #1 and class #2 when time multiplexing of the input images is used. A plot of the probability of error versus the second layer output threshold level when time multiplexing of the input images is used is shown in FIG. 15E. The inputs are the facial images of class #1 and class #2 with different head perspectives and various distortions, such as described hereinbefore. With an appropriate threshold level, the overall probability of error of the system can be reduced to zero.

Figure 16:
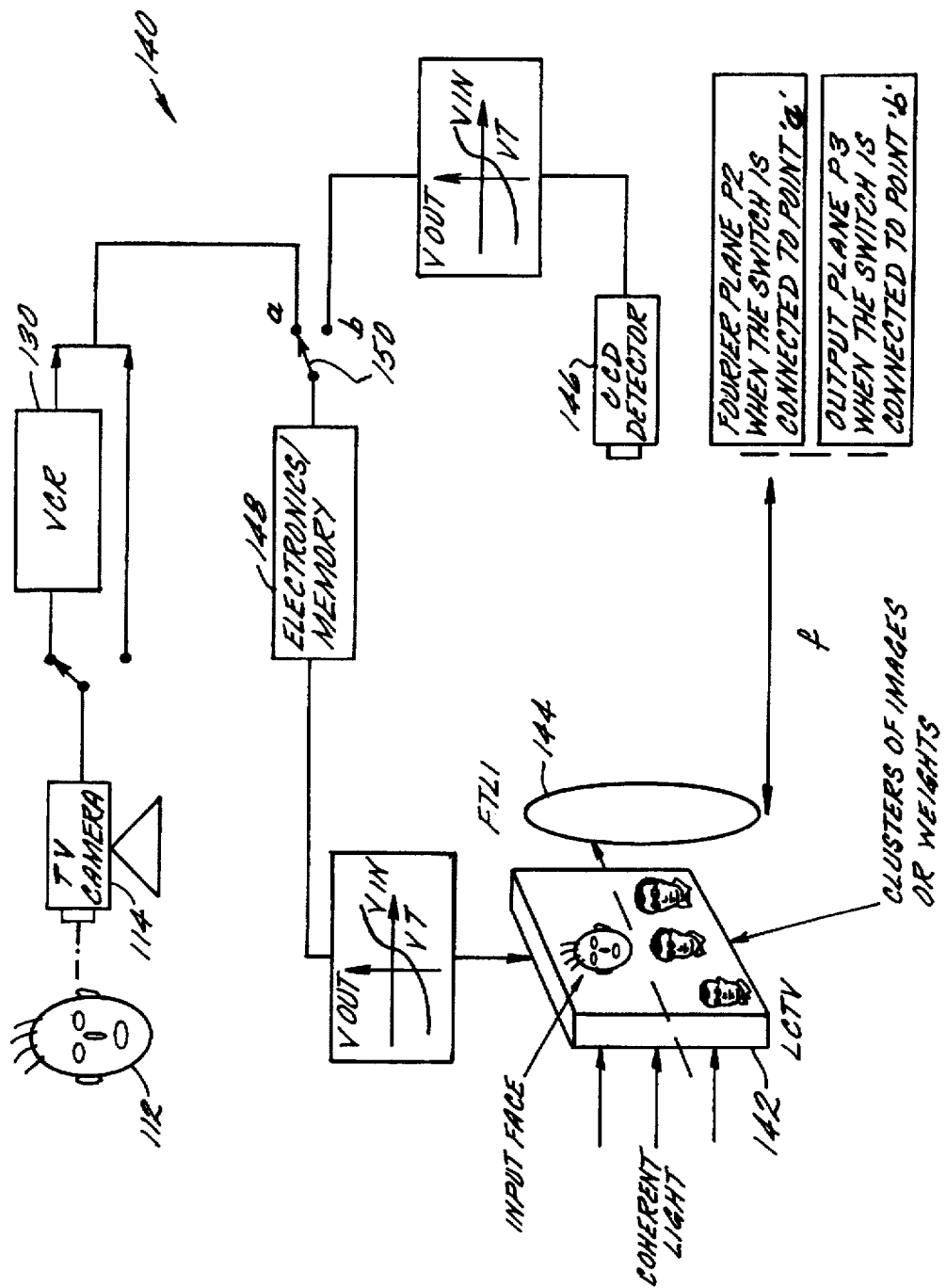
FIG. 16 is a schematic block diagram of a single spatial light modulator nonlinear joint transform correlator based neural networks for face recognition in accordance with an alternate embodiment of the present invention.
Figure 17A:
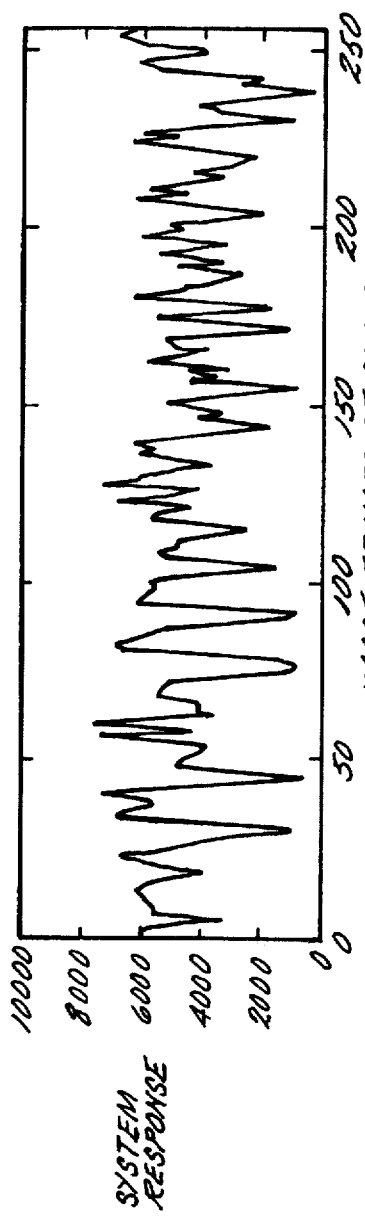
FIG. 17A is a plot of the neural networks response to facial images of class #1 using the single spatial light modulator nonlinear joint transform correlator architecture shown in FIG. 16.
Figure 17B:
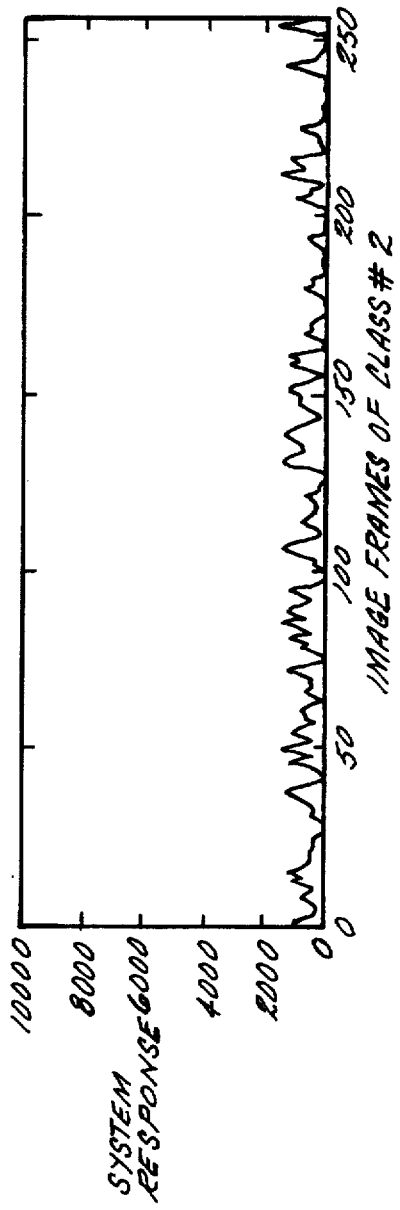
FIG. 17B is a plot of the neural networks response to facial images of class #2 using the single spatial light modulator nonlinear joint transform correlator architecture shown in FIG. 16.
Figure 17C:
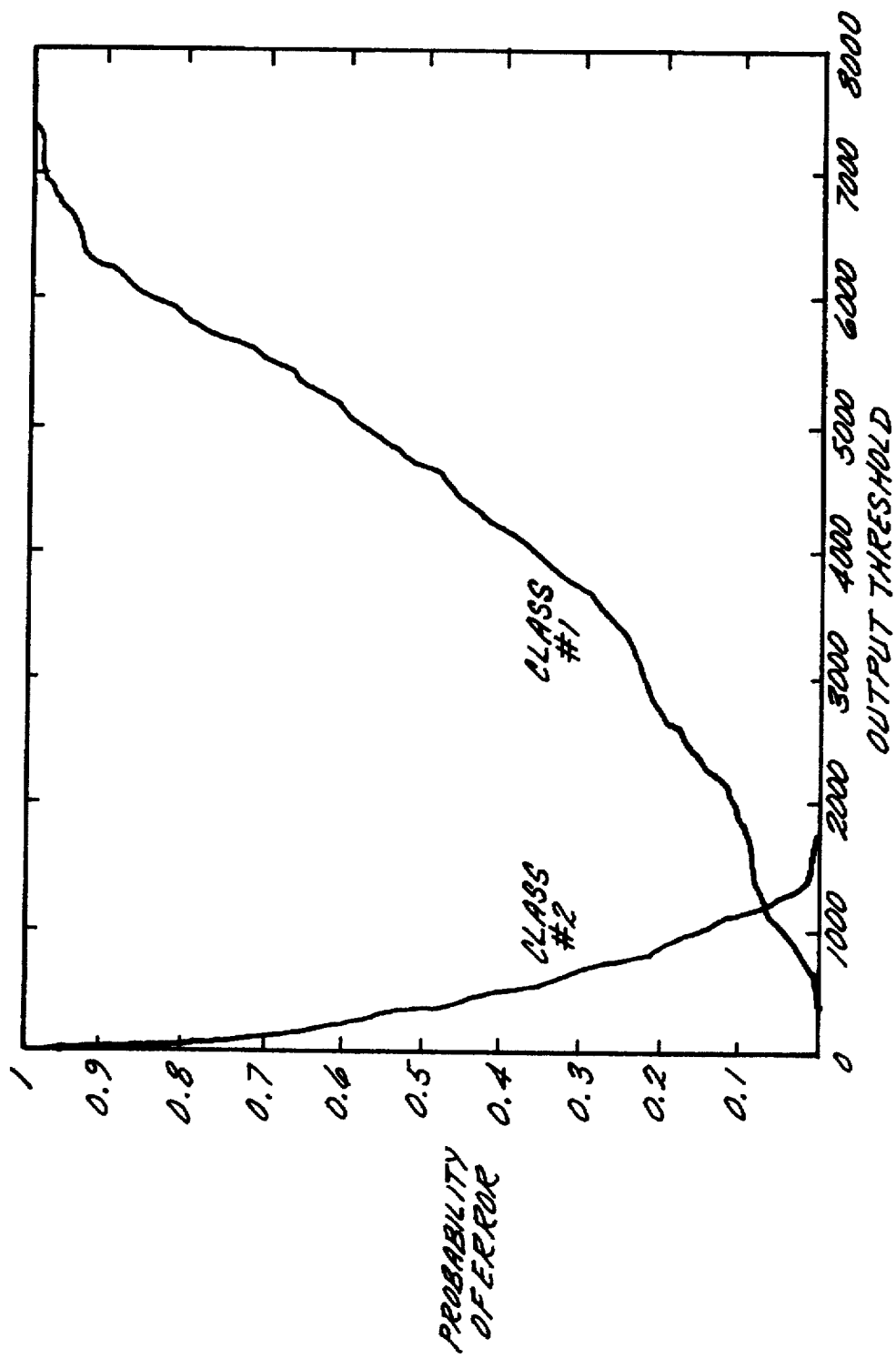
FIG. 17C are plots of the error probability versus the second layer output threshold level.
Figure 17D:
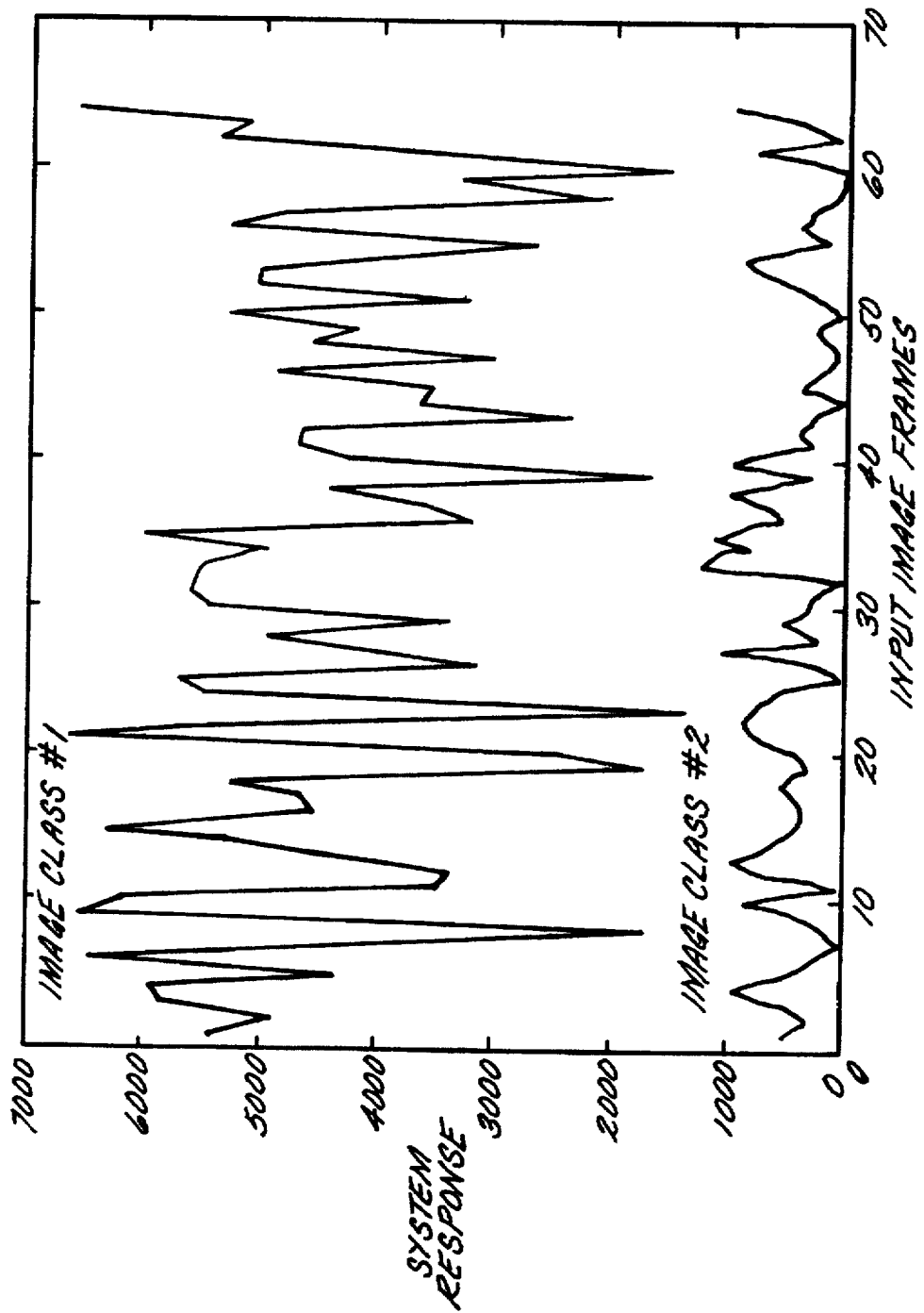
FIG. 17D are plots of the optical neural networks response to facial images of class #1 and class #2 when time multiplexing of the input images is used.
Figure 17E:
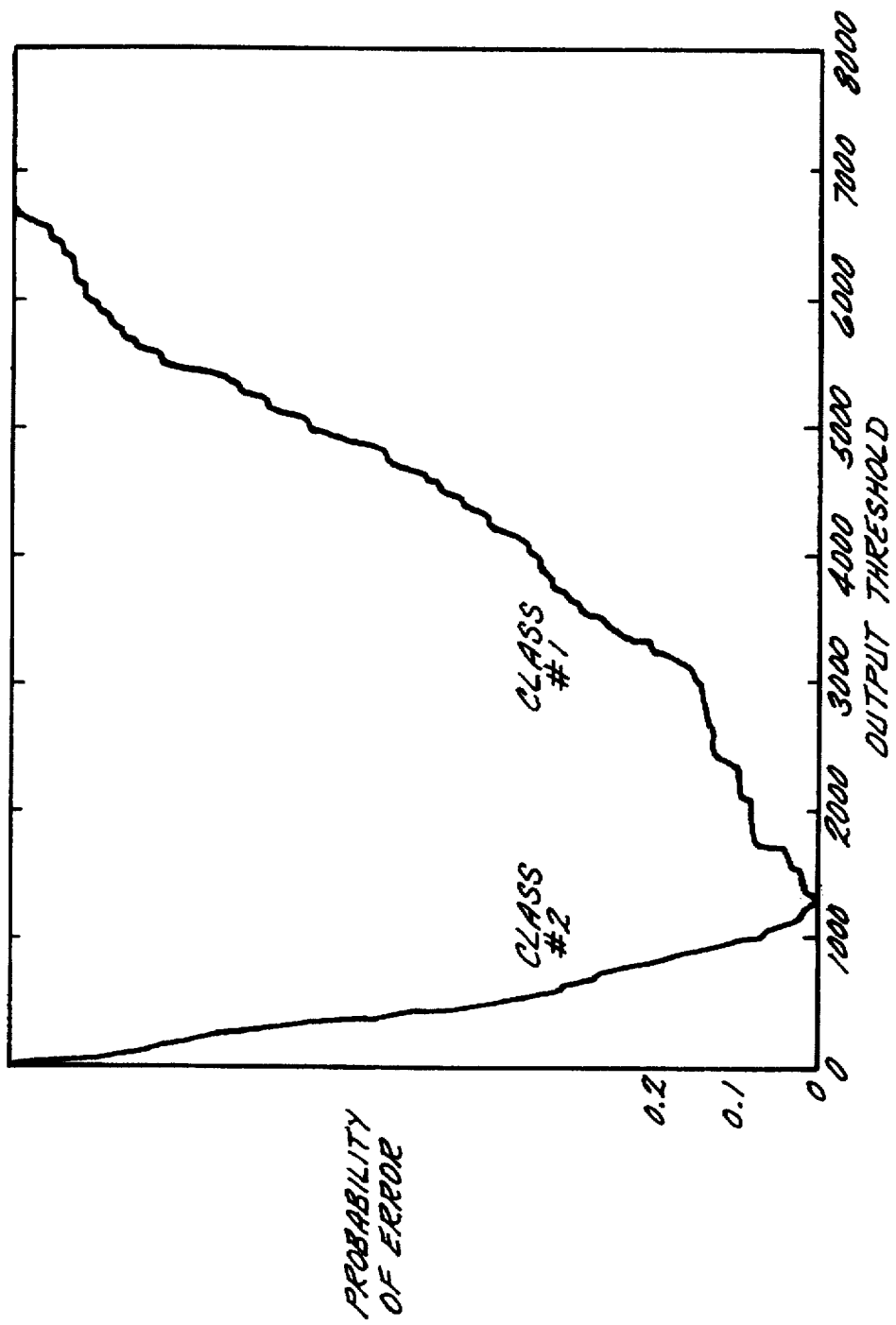
FIG. 17E are plots of the probability of error versus the second layer output threshold level when time multiplexing of the input images are used.

Referring now to FIG. 16, a compact single spatial light modulator JTC (such as the type described in an article entitled "Single SLM Joint Transform Correlator", by B. Javidi and J. L. Homer, Appl. Opt. vol. 28, pp. 1027–1032, 1989, which is expressly incorporated herein by reference) based neural networks for face recognition is shown generally at 140. A liquid crystal television 142 is used to display both the input image and the clusters as well as the joint power spectrum using time multiplexing. First, the input image and the cluster are displayed side by side on the liquid crystal television 142. The interference between the Fourier transforms of the input image and the cluster is obtained using a Fourier transform lens 144, and a CCD 146 camera is used to produce the joint power spectrum. A nonlinear transformation is applied to the joint power spectrum before it is displayed onto the liquid crystal television 142 so that a binary nonlinear joint transform correlation is obtained which improves the system performance. The joint power spectrum is written onto the same liquid crystal television 142. The correlation signals are produced by taking the Fourier transform using the same lens 144. Electronics 148 are used to actuate a switch 150 the liquid crystal television 142 to work as the input plane device or as the Fourier plane device. The system output response is determined by using electronics to add the first layer 52 output peak intensities that exceed an intensity threshold. FIG. 17A shows the system responses to class #1 facial images and FIG. 17B shows the corresponding system responses to class #2 facial images. In both cases, clusters for class #1 are used. In the plots of FIGS. 17A-B, the unit of the system response is nW. The system probability of error versus the output threshold level is shown in FIG. 17C. This FIGURE shows that the system can classify class #1 and class #2 images with a minimum probability of error of about 5%. Using time multiplexing of the input images of the same person, the minimum probability of error can be reduced to zero. FIG. 17D shows the optical neural networks response to facial images of class #1 and class #2 when time multiplexing of the input images is used. FIG. 17E shows the probability of error versus the second layer 54 output threshold level when time multiplexing of the input images is used in the system 140 of FIG. 16.

A compact low-cost face recognition system 140 is presented in FIG. 16. The capacity of the system for identification depends on the memory of the system. For example, if eight clusters each of which contains six weight images are used to recognize one person then a space of 64 Kbytes would be required. A single hard disk of 270 Mbytes can store clusters for more than 4200 people. A general purpose personal computer and commercially available software (e.g., MAT LAB) can be used. This results in swapping images from the old model frame grabber board to computer memory through the computer hard disk, a time consuming process. In such an example, the time for addressing a person's clusters is about one second, and the procedure for identifying a person takes about six seconds. Alternatively, the clusters or the weights can be stored on identification cards together with the identification number so that the neural processor does not require a large memory. For example, the clusters of images or weights can be stored photographically on an identification card. Since the photographic film has a large dynamic range and high resolution, a large number of clusters corresponding to different head perspectives and various distortions of images can be stored in a single card. This card which contains the clusters is placed at the input of the nonlinear JTC to be compared with the input image. The identification system does not need to have a large memory or extensive electronics to store clusters or weights for an image class. The implementation of the second layer and classification is similar to the procedure described hereinbefore.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A real-time object recognition system comprising:
    image detector means for capturing an input image of an object to be recognized;
    means for storing a plurality of reference images, each of said reference images being indicative of a cluster of images of an object on record; and
    a two-layer neural network comprising,
    a first layer for nonlinear joint correlation of said input image with each corresponding said reference image to generate a corresponding correlation signal, and
    a second layer having nonlinearity for combining said correlation signals to provide a combined correlation signal, wherein said combined correlation signal above a threshold is indicative that the object to be recognized is the object on record.

2. The system of claim 1 wherein said first layer of said two-layer neural network comprises a joint transform correlator.

3. The system of claim 2 wherein said joint transform correlator is a nonlinear joint transform correlator.

4. The system of claim 3 wherein said joint transform correlator comprises:
    a first spatial light modulator receptive to said input image and said reference images, said first spatial light modulator positioned at an input plane of said joint transform correlator, said first spatial light modulator for projecting said input image and for projecting said reference images;
    a first Fourier transform lens positioned for jointly Fourier transforming said input image and said reference images to project corresponding joint Fourier transformed images;
    a second spatial light modulator receptive to said joint Fourier transformed images, said second light modulator positioned at a Fourier plane of said joint transform correlator, said second spatial light modulator for projecting a joint power spectrum for each of said joint transformed images;
    a second Fourier transform lens positioned for Fourier transforming said joint power spectrums to project corresponding correlation images indicative of a correlation between said input image and a corresponding said reference image; and
    detector means for detecting said correlation images to provide said correlation signals, said detector means positioned at an output plane of said joint transform correlator.

5. The system of claim 4, wherein said first spatial light modulator comprises a liquid crystal television.

6. The system of claim 4, wherein said first spatial light modulator comprises an electronically addressed spatial light modulator.

7. The system of claim 4, wherein said first spatial light modulator comprises an optically addressed spatial light modulator.

8. The system of claim 4, wherein said second spatial light modulator means comprises a liquid crystal light valve.

9. The system of claim 4, wherein said second spatial light modulator comprises an electronically addressed spatial light modulator.

10. The system of claim 4, wherein said second spatial light modulator comprises an optically addressed spatial light modulator.

11. The system of claim 4 wherein said joint power spectrum is a nonlinear joint power spectrum comprising an expression:

$$g(E) = \sum_{v=0}^{\infty} H_v[S(\alpha,\beta)R(\alpha,\beta)]\cos[2v x_0\alpha + v\Phi_s(\alpha,\beta) - v\Phi_R(\alpha,\beta)]$$

where, $$H_v[S(\alpha,\beta)R(\alpha,\beta)] = \frac{\epsilon_v}{2\pi} \int G(\omega)\exp\{j\omega[S^2(\alpha,\beta) + R^2(\alpha,\beta)]\} J^v[2\omega R(\alpha,\beta)S(\alpha,\beta)]d\omega$$

where,
    $\alpha$ and $\beta$ are spatial frequency coordinates,
    $R(\alpha,\beta)\exp\{j\Phi_R(\alpha,\beta]$ is the Fourier transform of a reference image function $r(x,y)$,
    $S(\alpha,\beta)\exp[j\Phi_s(\alpha,\beta)]$ is the Fourier transform of an input image function $s(x,y)$,
    $G(\omega)$ is the Fourier transform of the nonlinearity, and
    $x_o$ is the refraction between the input function and the reference function.

12. The system of claim 1, wherein during a training mode of operation:
    said image detector means further comprises means for capturing a plurality of training images for the object on record,
    said training images being combined in accordance with a learning algorithm to generate a plurality of corresponding said reference images.

13. The system of claim 12 wherein said learning algorithm is a perception learning algorithm.

14. The system of claim 13 wherein said perceptron learning algorithm comprises:

$$w(t+1)=w(t)+\mu(t)x(t),$$

where;
    $w=(w_1,w_2 \ldots ,w_N)^T$ is a weight vector at time t,
    $x(t)$ is an input pattern at time t, and
    $\mu t(t)$ is a multiplier that is given by:

$$\mu(t) = \begin{cases} 0 & \text{if } y(t) \geq 0 \text{ and } x(t) \in C_1 \\ & \text{or } y(t) < 0 \text{ and } x(t) \in C_2 \\ -1 & \text{if } y(t) \geq 0 \text{ and } x(t) \in C_2 \\ 1 & \text{if } y(t) < 0 \text{ and } x(t) \in C_1 \end{cases}$$

15. The system of claim 1 wherein:
    said image detector means further comprises means for capturing a plurality of input images of the object to be recognized,
    said plurality of input images being time multiplexed; and
    whereby each said correlation signal is indicative of a correlation between said time multiplexed input images and a corresponding said reference image.

16. The system of claim 3 wherein said first layer of said two-layer neural network comprises:
   signal processing means having memory means, said memory means including said means for storing said plurality of reference images; and
   a joint transform correlator comprising;
   (1) spatial light modulator means,
   (2) a Fourier transform lens,
   (3) detector means, and
   (4) switch means for switching between a first position wherein said signal processing means is connected to said camera means and a second position wherein said signal processing means is connected to said detector means,
   (A) with said switch means in said first position,
      (a) said signal processing means is receptive to an input facial image signal indicative of said input image, said input facial image signal is stored in said memory means,
      (b) said spatial light modulator (SLM) means is receptive to said input image signal and reference image signals indicative of said reference images, said spatial light modulator positioned at an input plane of said joint transform correlator, said spatial light modulator for projecting a SLM input image in response to said input facial image signal and for projecting SLM reference images in response to said reference image signals,
      (c) said Fourier transform lens is positioned for jointly Fourier transforming said input image and each corresponding said reference image to project corresponding joint transformed images, and
      (d) said detector means for detecting said joint transformed images, said detector means is positioned at a Fourier plane of said joint transform correlator, said detector means generates a joint power spectrum signal for each of said joint transformed images,
   (B) with said switch means in said second position,
      (a) said signal processing means is receptive to said joint power spectrum signals which are stored in said memory means,
      (b) said spatial light modulator means is receptive to said joint power spectrum signals, said spatial light modulator for projecting a joint power spectrum image in response to each of said joint power spectrum signals,
      (c) said Fourier transform lens transforms said joint power spectrum images to project corresponding correlation images indicative of a correlation between said input image and a corresponding said reference image, and
      (d) said detector means for detecting said correlation images to provide said correlation signals, said detector means positioned at an output plane of said joint transform correlator, wherein said output plane of said joint transform correlator with said switch means in said second position is said Fourier plane of said joint transform correlator in said first position.

17. The system of claim 16, wherein said spatial light modulator means comprises a liquid crystal television.

18. The system of claim 16, wherein said spatial light modulator comprises an electronically addressed spatial light modulator.

19. The system of claim 16, wherein said spatial light modulator comprises an optically addressed spatial light modulator.

20. The system of claim 16 wherein said joint power spectrum is a nonlinear joint power spectrum comprising an expression:

$$g(E) = \sum_{v=o}^{\infty} H_v[S(\alpha,\beta)R(\alpha,\beta)]\cos[2v x_0 \alpha + v\Phi_s(\alpha,\beta) - v\Phi_R(\alpha,\beta)]$$

where, $H_v[S(\alpha,\beta)R(\alpha,\beta)] =$ $$\frac{\epsilon_v}{2\pi} \int |G(\omega)| \exp\{j\omega[S^2(\alpha,\beta) + R^2(\alpha,\beta)]\} J^v[2\omega R(\alpha,\beta)S(\alpha,\beta)] d\omega$$

where,

α and β are spatial frequency coordinates, $R(\alpha,\beta)\exp\{j\Phi_R(\alpha,\beta]\}$ is the Fourier transform of a reference image function r(x,y), $S(\alpha,\beta)\exp[j\Phi_s(\alpha,\beta)]$ is the Fourier transform of an input image function s(x,y), G(ω) is the Fourier transform of the nonlinearity, and $x_o$ is the refraction between the input function and the reference function.

21. The system of claim 1 wherein said means for storing a plurality of reference images comprises an optical film having said reference images thereon.

22. The system of claim 1 wherein said means for storing a plurality of reference images comprises an optical memory having said reference images thereon.

23. The system of claim 21 wherein said optic film is disposed on a card.

24. The system of claim 1 wherein said means for storing a plurality of reference images comprises recording said reference images in a thick optical material, the thickness of said optical material being at least several times the wavelength of light from which said reference images were recorded.

25. The system of claim 1 wherein said two-layer neural network comprises:
   signal processing means for processing an input image signal indicative of said input image and reference image signals indicative of said reference images, said signal processing means including memory means for storing signals including signals defining an executable algorithm of a nonlinear filter to generate said correlation signals at said first layer of said two-layer neural network, said signal processing means for combining said correlation signals to provide said combined correlation signal at said second layer of said two-layer neural network.

26. The system of claim 25 wherein said algorithm of said nonlinear filter comprises the following expression:

$$g(E) = \sum_{v=o}^{\infty} H_v[S(\alpha,\beta)R(\alpha,\beta)]\cos[2v x_0 \alpha + v\Phi_s(\alpha,\beta) - v\Phi_R(\alpha,\beta)]$$

where, $H_v[S(\alpha,\beta)R(\alpha,\beta)] =$ $$\frac{\epsilon_v}{2\pi} \int |G(\omega)| \exp\{j\omega[S^2(\alpha,\beta) + R^2(\alpha,\beta)]\} J^v[2\omega R(\alpha,\beta)S(\alpha,\beta)] d\omega$$

where,

α and β are spatial frequency coordinates, $R(\alpha,\beta)\exp\{j\Phi_R(\alpha,\beta)\}$ is the Fourier transform of a reference image function $r(x,y)$, $S(\alpha,\beta)\exp[j\Phi_s(\alpha,\beta)]$ is the Fourier transform of an input image function $s(x,y)$, $G(\omega)$ is the Fourier transform of the nonlinearity, and $x_o$ is the refraction between the input function and the reference function.

27. The system of claim 25, wherein during a training mode of operation:

said image detector means further comprises means for capturing a plurality of training images for the object on record and generating a corresponding plurality of training image signals indicative thereof; and said memory means for storing signals defining an executable learning algorithm for combining said training image signals to generate a plurality of corresponding said reference image signals, said executable learning algorithm is a perceptron learning algorithm.

28. The system of claim 27 wherein said algorithm comprises a perceptron learning algorithm comprising the following expression:

$$w(t+1)=w(t)+\mu(t)x(t),$$

where;

$w=(w_1,w_2 \ldots ,w_N)^T$ is a weight vector at time t, $x(t)$ is an input pattern at time t, and $\mu(t)$ is a multiplier that is given by:

$$\mu(t) = \begin{cases} 0 & \text{if } y(t) \geq 0 \text{ and } x(t) \in C_1 \\ & \text{or } y(t) < 0 \text{ and } x(t) \in C_2 \\ -1 & \text{if } y(t) \geq 0 \text{ and } x(t) \in C_2 \\ 1 & \text{if } y(t) < 0 \text{ and } x(t) \in C_1 \end{cases}$$

29. The system of claim 25 wherein:

said image detector means further comprises means for capturing a plurality of input images of the object to be recognized and generates a corresponding plurality of image signals indicative thereof, and said plurality of image signals being time multiplexed to generate said input image signal.

30. The system of claim 1 wherein said second layer of said two-layer neural network comprises:

said second layer for summing said correlation signals and binarizing said summed correlation signals to provide said combined correlation signal.

31. The system of claim 1 wherein said second layer having nonlinearity comprises said second layer having a multiple level nonlinearity for indicating a degree of confidence for recognition.

32. A method for real-time object recognition comprising the steps of:

capturing an input image of an object to be recognized;

storing a plurality of reference images, each of said reference images being indicative of a cluster of images of an object on record; and nonlinearly jointly correlating said input image with each corresponding said reference image at a first layer of a two-layer neural network to generate a corresponding correlation signal, and combining said correlation signals at a second layer having nonlinearity of said two-layer neural network to provide a combined correlation signal, wherein said combined correlation signal above at least one threshold is indicative that the object to be recognized is the object on record.

33. The method of claim 32 wherein said step of jointly correlating comprises the steps of:

projecting said input image;

projecting said reference images;

jointly Fourier transforming said input image and said reference images to project corresponding joint transformed images;

projecting a joint power spectrum for each of said joint transformed images;

Fourier transforming said joint power spectrums to project corresponding correlation images indicative of a correlation between said input image and a corresponding said reference image; and detecting said correlation images to provide said correlation signals.

34. The method of claim 33 wherein said joint power spectrum is a nonlinear joint power spectrum comprising an expression:

$$g(E) = \sum_{v=o}^{\infty} H_v[S(\alpha,\beta)R(\alpha,\beta)]\cos[2v\pi_0\alpha + v\Phi_s(\alpha,\beta) - v\Phi_R(\alpha,\beta)]$$

where, $$H_v[S(\alpha,\beta)R(\alpha,\beta)] = \frac{\epsilon_v}{2\pi} \int G(\omega)\exp\{j\omega[S^2(\alpha,\beta) + R^2(\alpha,\beta)]\}J^v[2\omega R(\alpha,\beta)S(\alpha,\beta)]d\omega$$

where, $\alpha$ and $\beta$ are spatial frequency coordinates, $R(\alpha,\beta)\exp\{j \Phi_R(\alpha,\beta]$ is the Fourier transform of a reference image function $r(x,y)$, $S(\alpha,\beta)\exp[j\Phi_s(\alpha,\beta)]$ is the Fourier transform of an input image function $s(x,y)$, $G(\omega)$ is the Fourier transform of the nonlinearity, and $x_o$ is the refraction between the input facial function and the reference function.

35. The method of claim 32, wherein during a training mode of operation:

said step of capturing comprises capturing a plurality of training images for the object on record; and combining said training images in accordance with a learning algorithm to generate a plurality of corresponding said reference images.

36. The method of claim 35 wherein said learning algorithm is a perception learning algorithm.

37. The method of claim 36 wherein said perceptron learning algorithm comprises:

$$w(t+1)=w(t)+\mu(t)x(t),$$

where;

$w=(w_1,w_2 \ldots ,w_N)^T$ is a weight vector at time t, $x(t)$ is an input pattern at time t, and μ(t) is a multiplier that is given by:

$$\mu(t) = \begin{cases} 0 & \text{if } y(t) \geq 0 \text{ and } x(t) \in C_1 \\ & \text{or } y(t) < 0 \text{ and } x(t) \in C_2 \\ -1 & \text{if } y(t) \geq 0 \text{ and } x(t) \in C_2 \\ 1 & \text{if } y(t) < 0 \text{ and } x(t) \in C_1 \end{cases}$$

38. The method of claim 32 wherein:
said step of capturing further comprises capturing a plurality of input images of the object to be recognized;
time multiplexing said plurality of input images; and
whereby said correlation signals are indicative of a correlation between said time multiplexed input images and a corresponding said reference image.

39. The method of claim 32 wherein said step of jointly correlating comprises the steps of:
switching between a first position and a second position,
(A) in said first position,
 (a) projecting a spatial light modulator input image,
 (b) projecting spatial light modulator reference images,
 (c) jointly Fourier transforming said input image and each corresponding said reference image to project corresponding joint transformed images,
 (d) detecting said joint transformed images,
 (e) generating a joint power spectrum signal for each of said joint transformed images,
(B) in said second position,
 (a) projecting a joint power spectrum image in response to each of said joint power spectrum signals,
 (b) Fourier transforming said joint power spectrum images,
 (c) projecting corresponding correlation images indicative of a correlation between said input image and a corresponding said reference image, and
 (d) detecting said correlation images with nonlinearity,
 (e) generating said correlation signals.

40. The method of claim 39 wherein said joint power spectrum signal is a nonlinear joint power spectrum signal comprising an expression:

$$g(E) = \sum_{v=o}^{\infty} H_v[S(\alpha,\beta)R(\alpha,\beta)]\cos[2v x_0 \alpha + v\Phi_s(\alpha,\beta) - v\Phi_R(\alpha,\beta)]$$

where, $$H_v[S(\alpha,\beta)R(\alpha,\beta)] =$$

$$\frac{e_v}{2\pi} \int^v |G(\omega)\exp\{j\omega[S^2(\alpha,\beta) + R^2(\alpha,\beta)]\} J^v[2\omega R(\alpha,\beta)S(\alpha,\beta)]d\omega$$

where,
α and β are spatial frequency coordinates,
$R(\alpha,\beta)\exp\{j\Phi_R(\alpha,\beta)\}$ is the Fourier transform of a reference image function r(x,y),
$S(\alpha,\beta)\exp[j\Phi_s(\alpha,\beta)]$ is the Fourier transform of an input image function s(x,y),
G(ω) is the Fourier transform of the nonlinearity, and
$x_o$ is the refraction between the input function and the reference function.

41. The method of claim 32 wherein said step of jointly correlating comprises jointly correlating using a nonlinear filter.

42. The method of claim 41 wherein said nonlinear filter comprises the following expression:

$$g(E) = \sum_{v=o}^{\infty} H_v[S(\alpha,\beta)R(\alpha,\beta)]\cos[2v x_0 \alpha + v\Phi_s(\alpha,\beta) - v\Phi_R(\alpha,\beta)]$$

where, $$H_v[S(\alpha,\beta)R(\alpha,\beta)] =$$

$$\frac{e_v}{2\pi} \int^v |G(\omega)\exp\{j\omega[S^2(\alpha,\beta) + R^2(\alpha,\beta)]\} J^v[2\omega R(\alpha,\beta)S(\alpha,\beta)]d\omega$$

where,
α and β are spatial frequency coordinates,
$R(\alpha,\beta)\exp\{j\Phi_R(\alpha,\beta)\}$ is the Fourier transform of a reference image function r(x,y),
$S(\alpha,\beta)\exp[j\Phi_s(\alpha,\beta)]$ is the Fourier transform of an input image function s(x,y),
G(ω) is the Fourier transform of the nonlinearity, and
$x_o$ is the refraction between the input function and the reference function.

43. The method of claim 32 wherein wherein said step of jointly correlating comprises jointly correlating using a joint transform correlator.

44. The method of claim 32 wherein wherein said step of jointly correlating comprises jointly correcting using a nonlinear joint transform correlator.

45. The method of claim 32 wherein said step of combining at said second layer comprises:
summing said correlation signals which have passed through a nonlinearity; and
binarizing said summed correlation signals to provide said combined correlation signal.

46. The method of claim 32 wherein said second layer having nonlinearity comprises said second layer having a multiple level nonlinearity for indicating a degree of confidence for recognition.

47. A real-time object recognition system comprising:
image detector means for capturing an input image of an object to be recognized;
a plurality of reference images, each of said reference images being indicative of a cluster of images of an object on record, said reference images stored on an optical film deposited on a card; and
a two-layer neural network comprising,
 (1) a first layer comprising,
  (a) a light source for illuminating each of said reference images to project corresponding reference images,
  (b) a spatial light modulator receptive to said input image, said spatial light modulator in response to illumination by said light source projecting said input image, and
  (c) detector means for detecting combined corresponding said reference images and said input image to provide a corresponding nonlinear joint correlation signal, each of said joint correlation signals being indicative of a joint correlation between said input image and each corresponding said reference image, and
 (2) a second layer having nonlinearity for combining said correlation signals to provide a combined correlation signal.

48. The system of claim 47 wherein said spatial light modulator comprises a liquid crystal television.

49. The system of claim 47 wherein said spatial light modulator comprises an electronically addressed spatial light modulator.

50. The system of 47 wherein said spatial light modulator comprises an optically addressed spatial light modulator.

51. The system of 47 wherein said spatial light modulator comprises a liquid crystal light value.

52. The system of claim 47 wherein:

said image detector means further comprises means for capturing a plurality of input images of the object to be recognized, said plurality of input images being time multiplexed; and whereby each said correlation signal is indicative of a correlation between said time multiplexed input images and a corresponding said reference image.

53. A method for real-time object recognition comprising the steps of:

capturing an input image of an object to be recognized;

storing a plurality of reference images each of said reference images being indicative of a cluster of images of an object on record, storing said reference images on an optical film deposited on a card;

at a first layer of a two-layer neural network,
(a) illuminating each of said reference images to project corresponding reference images,
(b) illuminating a spatial light modulator receptive to said input image to project said input image,
(c) detecting combined corresponding said reference images and said input image to provide a corresponding nonlinear joint correlation signal, each of said joint correlation signals being indicative of a joint correlation between said input image and each corresponding said reference image; and combining at a second layer having nonlinearity of said two-layer neural network said correlation signals to provide a combined correlation signal, wherein said combined correlation signal above at least one threshold is indicative that the object to be recognized is the object on record.

54. The method of claim 53 wherein said spatial light modulator comprises a liquid crystal television.

55. The method of claim 53 wherein said spatial light modulator comprises an electronically addressed spatial light modulator.

56. The method of 53 wherein said spatial light modulator comprises an optically addressed spatial light modulator.

57. The method of 53 wherein said spatial light modulator comprises a liquid crystal light value.

58. The method of claim 53 wherein:

said step of capturing further comprises capturing a plurality of input images of the object to be recognized;

time multiplexing said plurality of input images; and whereby each said correlation signal is indicative of a correlation between said time multiplexed input images and a corresponding said reference image.

59. The system of claim 1 wherein said object is a person and said input image is an input facial image.

60. The method of claim 32 wherein said object is a person and said input image is an input facial image.

61. The system of claim 47 wherein said object is a person and said input image is an input facial image.

62. The method of claim 53 wherein said object is a person and said input image is an input facial image.

* * * * *